(12) United States Patent
Rico Alvarino et al.

(10) Patent No.: US 12,526,098 B2
(45) Date of Patent: Jan. 13, 2026

(54) MANAGEMENT OF UPLINK AND SRS TRANSMISSIONS ON DIFFERENT CARRIERS

(71) Applicant: QUALCOMM Incorporated, San Diego, CA (US)

(72) Inventors: Alberto Rico Alvarino, San Diego, CA (US); Seyedkianoush Hosseini, San Diego, CA (US); Alexandros Manolakos, Escondido, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/002,652

(22) PCT Filed: Sep. 3, 2021

(86) PCT No.: PCT/US2021/049163
§ 371 (c)(1),
(2) Date: Dec. 20, 2022

(87) PCT Pub. No.: WO2022/051681
PCT Pub. Date: Mar. 10, 2022

(65) Prior Publication Data
US 2023/0246765 A1 Aug. 3, 2023

(30) Foreign Application Priority Data
Sep. 4, 2020 (GR) ................ 20200100539

(51) Int. Cl.
*H04L 5/00* (2006.01)

(52) U.S. Cl.
CPC ............ *H04L 5/0048* (2013.01); *H04L 5/001* (2013.01); *H04L 5/0085* (2013.01)

(58) Field of Classification Search
None
See application file for complete search history.

(56) References Cited

U.S. PATENT DOCUMENTS 10,588,141 B2    3/2020  Rico Alvarino et al.
11,895,594 B2 *  2/2024  Dinan ................. H04W 52/362
(Continued)

FOREIGN PATENT DOCUMENTS

TW   202025684 A    7/2020
WO   2018005481     1/2018
(Continued)

OTHER PUBLICATIONS

ETSI TS 138 214, "5G;NR;Physical Layer procedures for data", Jul. 2020, 3GPP TS 38.214 15.10.0 Release 15, pp. 1-109 (Year: 2020).*
(Continued)

*Primary Examiner* — Steve R Young
(74) *Attorney, Agent, or Firm* — QUALCOMM Incorporated

(57) ABSTRACT

Aspects are provided which improve the effectiveness of conflict resolution between a scheduled uplink transmission and a carrier-switched sounding reference signal (SRS). A UE receives a physical downlink control channel (PDCCH) from a base station. The PDCCH schedules an uplink transmission on a first carrier. The UE determines whether to drop one of the uplink transmission or transmission of a SRS on a second carrier different than the first carrier based on a timing between a reception time of the PDCCH and a scheduled time for transmitting the SRS. By factoring the timing into determination, situations may be eliminated where the UE is unaware that an uplink transmission will be scheduled at the time of the carrier-switched SRS.

17 Claims, 19 Drawing Sheets

(56) References Cited

U.S. PATENT DOCUMENTS

| | | |
|---|---|---|
| 2017/0208581 A1 | 7/2017 | Yang et al. |
| 2017/0324528 A1* | 11/2017 | Rico Alvarino .......... H04L 5/14 |
| 2018/0270851 A1 | 9/2018 | Bhattad et al. |
| 2020/0053801 A1 | 2/2020 | Hosseini et al. |
| 2020/0221311 A1 | 7/2020 | Liu et al. |
| 2022/0116172 A1* | 4/2022 | Tang ..................... H04L 5/0007 |
| 2022/0248329 A1* | 8/2022 | Peng ................. H04W 52/0235 |
| 2024/0015747 A1* | 1/2024 | Gao .................. H04W 72/1268 |

FOREIGN PATENT DOCUMENTS

| | | |
|---|---|---|
| WO | 2020164093 A1 | 8/2020 |
| WO | 2020164589 A1 | 8/2020 |

OTHER PUBLICATIONS

"5G, NR, Physical layer procedures for data (3GPP TS 38.214 version 15.10.0 Release 15)", ETSI Technical Specification, European Telecommunications Standards Institute (ETSI), 650, Route Des Lucioles, F-06921 Sophia-Antipolis Cedex, France, vol. 3GPP RAN, No. V15.10.0, Jul. 23, 2020 (Jul. 23, 2020), pp. 1-109, XP014380210, p. 94-p. 98 p. 103.

International Search Report and Written Opinion—PCT/US2021/049163—ISA/EPO—Jan. 4, 2022.

Internet Literature. "3rd Generation Partnership Project; Technical Specification Group Radio Access Network, NR, Physical layer procedures for data (Release 15)", 3GPP TS 38.214, V15.10.0.3GPP. (Jun. 2020), 106 Pages, pp. 94 to 95 and 97.

Taiwan Search Report—TW110133034—TIPO—Jan. 10, 2025.

Ericsson: "Configuration of SRS Carrier Switching", 3GPP TSG-RAN WG2 #110e, Tdoc R2-2005072, Electronic Meeting, Jun. 1-12, 2020, Jun. 12, 2020, pp. 1-22, May 22, 2020, The Whole Document.

* cited by examiner

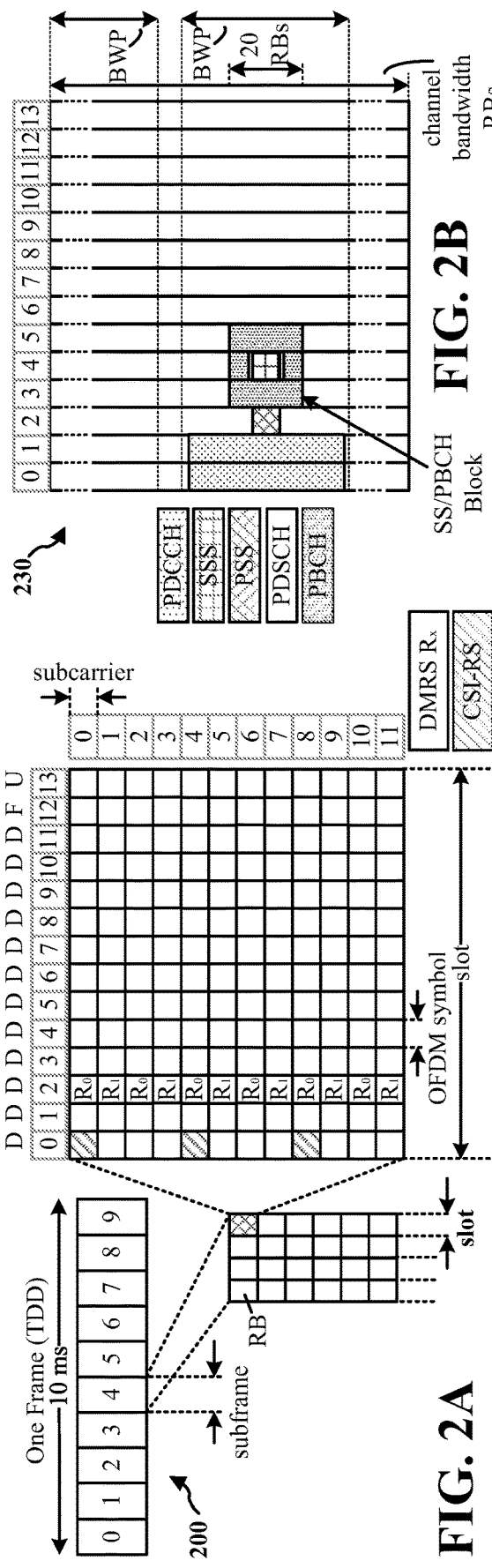
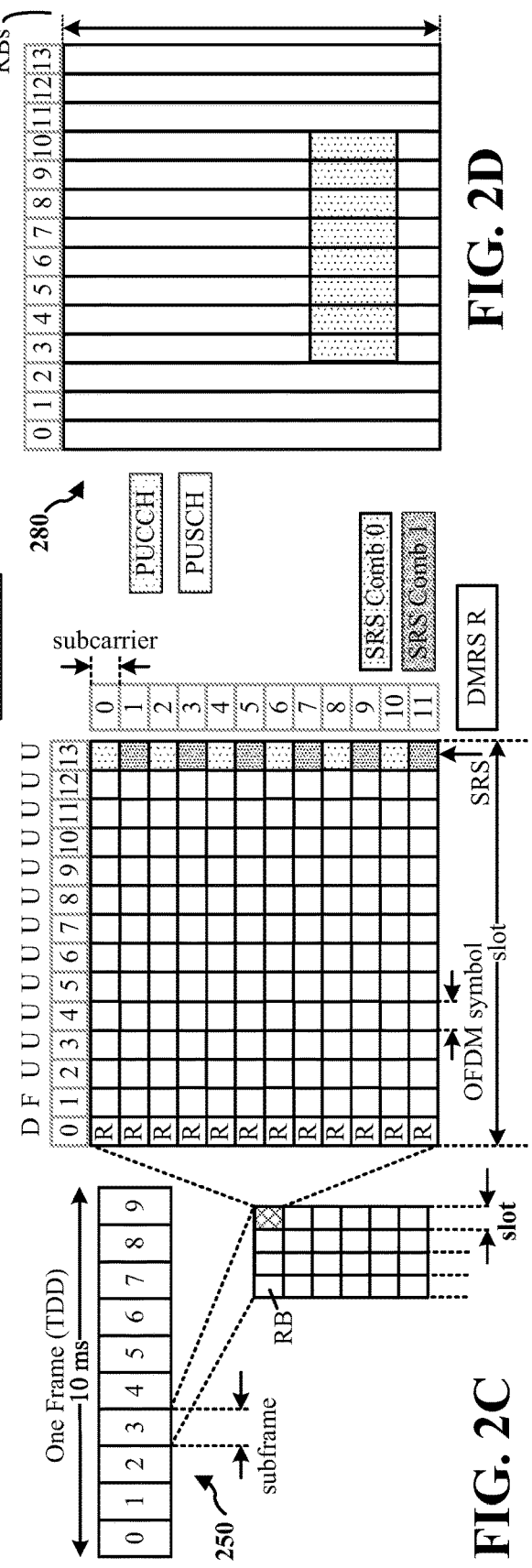
FIG. 2A
FIG. 2B
FIG. 2C
FIG. 2D

MANAGEMENT OF UPLINK AND SRS TRANSMISSIONS ON DIFFERENT CARRIERS

CROSS REFERENCE TO RELATED APPLICATION(S)

This application is a National Phase entry of PCT Application No. PCT/US2021/049163, entitled "MANAGEMENT OF UPLINK AND SRS TRANSMISSIONS ON DIFFERENT CARRIERS" and filed on Sep. 3, 2021, which claims priority of Greek application No. 20200100539, entitled "TIMELINES FOR SRS CARRIER SWITCHING" and filed on Sep. 4, 2020, both of which are expressly incorporated by reference herein in their entirety.

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives a physical downlink control channel (PDCCH) from a base station, the PDCCH scheduling an uplink transmission on a first carrier. The apparatus determines whether to drop one of the uplink transmission or transmission of a sounding reference signal (SRS) on a second carrier different than the first carrier based on a timing between a reception time of the PDCCH and a scheduled time for transmitting the SRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
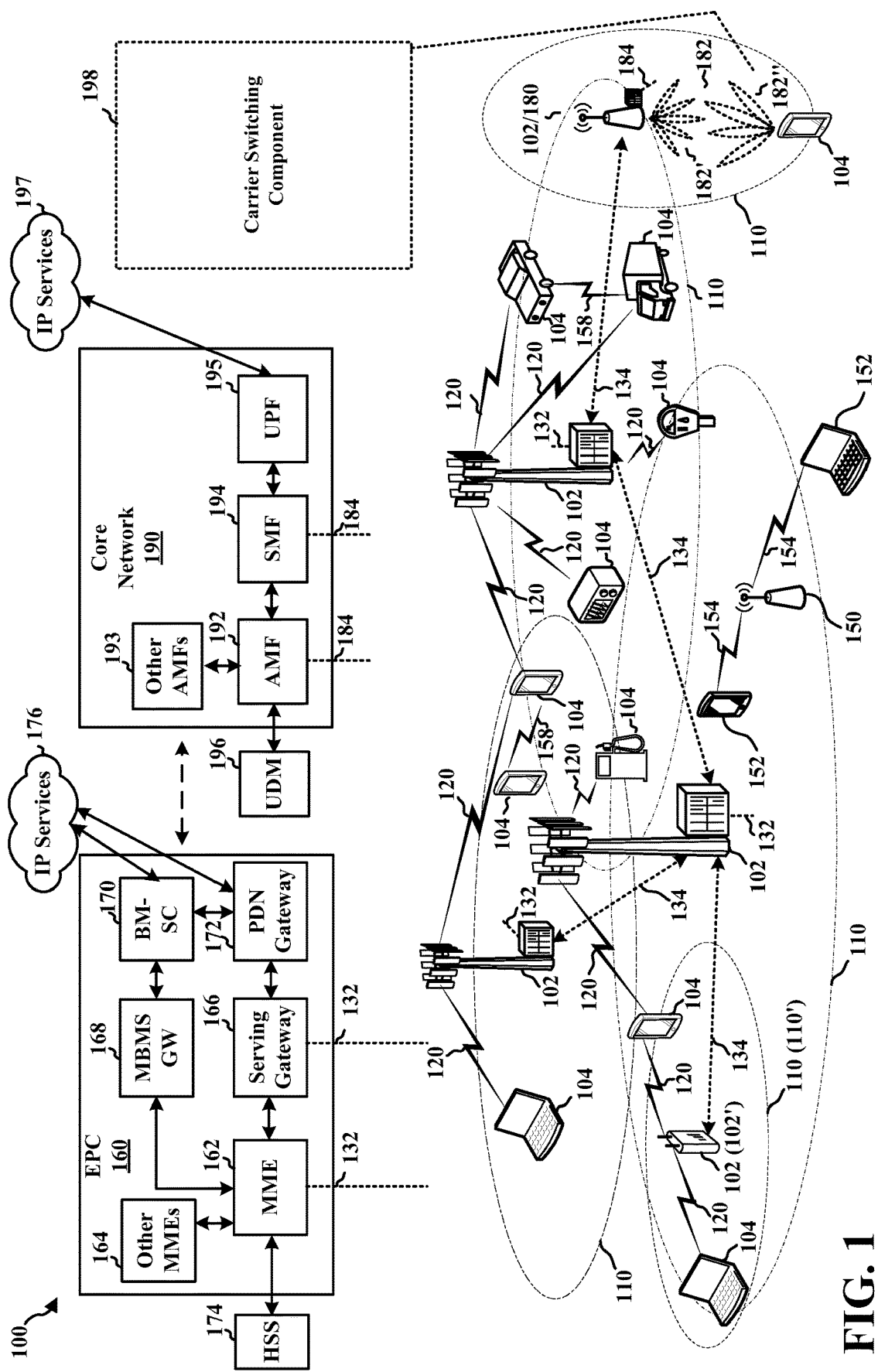
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A SRS is an uplink reference signal which a UE may transmit to a base station in order to allow the base station to estimate uplink channel quality for frequency-dependent scheduling or to estimate timing for timing alignment procedures. The base station may trigger the UE to transmit periodic or semi-persistent SRS in response to RRC signaling, or aperiodic SRS in response to a trigger in downlink control information (DCI). Generally, the UE may transmit SRS on the same carrier as that of the DCI or other downlink data. Such SRS may be referred to as non-carrier switched SRS. The UE may also transmit SRS on a different carrier than that of an uplink transmission scheduled by the DCI or other downlink data. Such SRS may be referred to as carrier switched SRS.

SRS carrier switching is typically not allowed in parallel with other carriers' uplink transmissions. In some cases, SRS carrier switching is not allowed in parallel with another carrier, which is the source for SRS carrier switching. Thus, the UE may not transmit a SRS on one carrier at the same time as another UE transmission (e.g. PUSCH, PUCCH, SRS, or PRACH) on a different carrier. As a result, it is possible for collisions between such uplink transmissions and carrier-switched SRS to occur. To handle these collisions, the UE may apply various conflict resolution rules to determine whether to prioritize a source carrier's uplink transmission over a carrier-switched SRS. Based on these rules, the UE may transmit or drop the carrier-switched SRS in order to prevent collisions with the uplink transmission.

However, the effectiveness of the conflict resolution rules depends on when the downlink data scheduling the uplink transmission is received relative to the scheduled time for the carrier-switched SRS. Generally, the UE decides whether to commence transmission of carrier-switched SRS a certain amount of time prior to a scheduled time to transmit the carrier-switched SRS, for example, to account for carrier switching time. This certain amount of time before which the UE transmits the carrier-switched SRS may be referred to as an SRS decision time. If the UE determines at the SRS decision time that a carrier-switched SRS will overlap with a scheduled uplink transmission, the UE may drop the carrier-switched SRS in favor of the uplink transmission (or vice-versa) depending on the conflict resolution rules. Yet, if the downlink data scheduling the uplink transmission is received after the SRS decision time, the UE may not be aware at the time it commences the carrier-switched SRS that the uplink transmission will even be scheduled. As a result, the UE may not be able to drop the SRS in favor of the uplink transmission per the conflict resolution rules, and a conflict between the carrier-switched SRS and the uplink transmission may occur.

To address this problem, aspects of the present disclosure allow the UE to determine whether to drop the SRS according to some conflict resolution rules, or to drop the uplink transmission according to other conflict resolution rules, based on a timing between the reception time for the downlink data and the SRS decision time. For example, if the UE receives a PDCCH no later than the SRS decision time, the UE may determine the uplink transmission scheduled by the PDCCH and apply one of the aforementioned conflict resolution rules accordingly. In this way, timing situations where conflicts may arise such as that described above may be avoided.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a carrier switching component 198 that is configured to receive a PDCCH from a base station, the PDCCH scheduling an uplink transmission on a first carrier. The carrier switching component 198 is also configured to determine whether to drop one of the uplink transmission or transmission of a SRS on a second carrier different than the first carrier based on a timing between a reception time of the PDCCH and a scheduled time for transmitting the SRS.

Although the following description may be focused on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
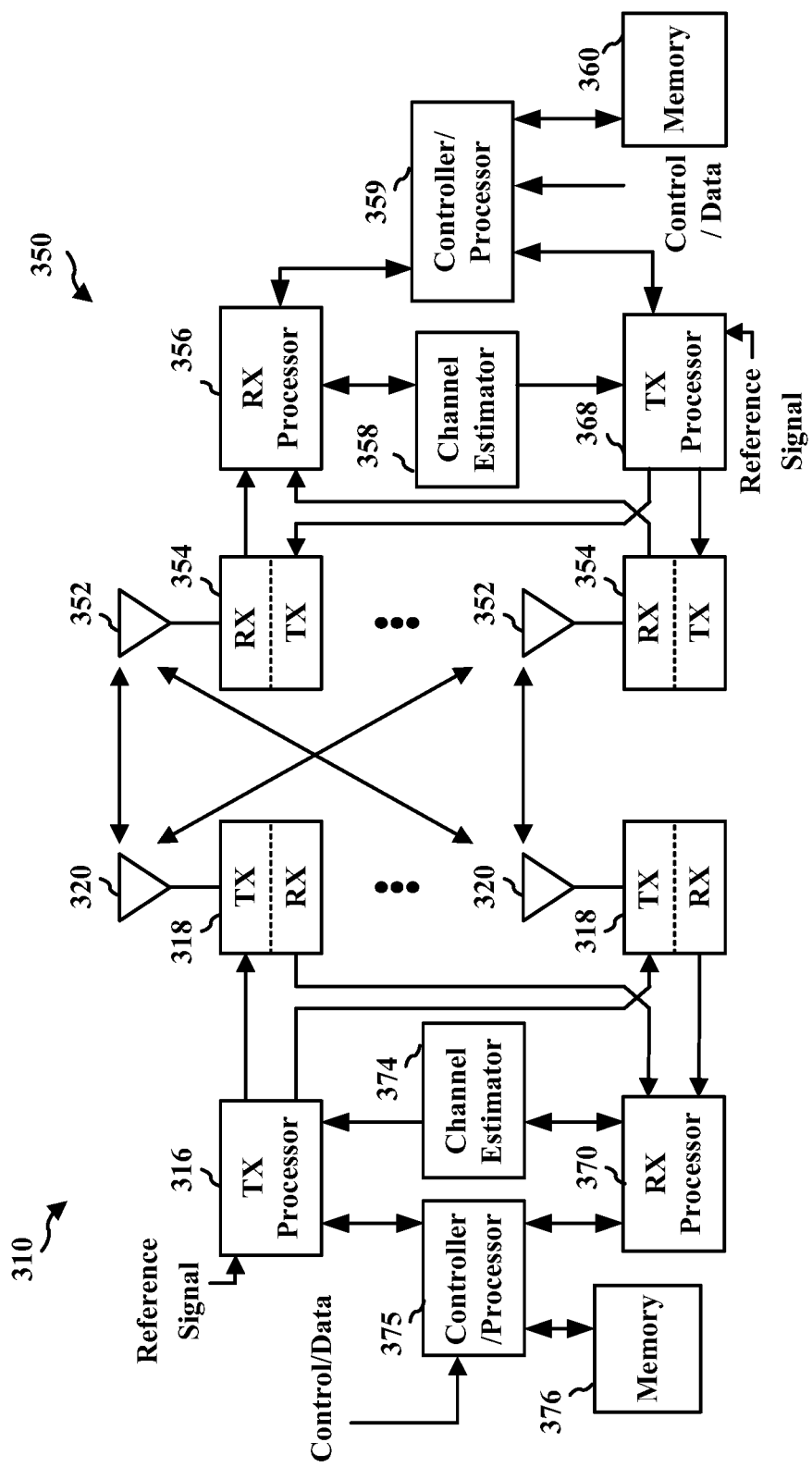
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with carrier switching component 198 of FIG. 1.

An SRS is an uplink reference signal which a UE may transmit to a base station in order to allow the base station to estimate uplink channel quality for frequency-dependent scheduling or to estimate timing for timing alignment procedures. The SRS may also assist the base station with downlink scheduling in time division duplexing (TDD) systems, where the downlink channel including the scheduling and the uplink channel including the SRS are the same. The base station may trigger the UE to transmit periodic or semi-persistent SRS in response to RRC signaling, or aperiodic SRS in response to a trigger in DCI. The UE may receive DCI in a PDCCH, and the UE may transmit the SRS in a physical uplink shared channel (PUSCH).

Generally, the UE may transmit aperiodic SRS on the same carrier as that of the DCI (e.g. a non-carrier switched SRS). For example, the UE may receive a downlink DCI, a group common DCI, or an uplink DCI based command where a codepoint of the DCI may trigger one or more SRS resource set(s) on the same carrier. For SRS in a resource set with usage set to 'codebook' or 'antennaSwitching', the minimal time interval between the last symbol of the PDCCH triggering the aperiodic SRS transmission and the first symbol of the SRS resource may be $N_2 + T_{switch}$, where $N_2$ represents a PUSCH preparation time and $T_{switch}$ represents an uplink switching gap duration (if existing). Otherwise, the minimal time interval between the last symbol of the PDCCH triggering the aperiodic SRS transmission and the first symbol of the SRS resource may be $N_2 + T_{switch} + 14$. The minimal time interval in units of OFDM symbols may be counted based on the minimum subcarrier spacing between the PDCCH and the aperiodic SRS. While this example refers to the minimal time interval as being based on $N_2$, the minimal time interval is not limited to $N_2$ and may be based on some other timing (e.g. a different number of symbols other than that represented by the PUSCH preparation time).

The value of $N_2$ may be calculated based on the worst case carrier between the involved carriers for carrier-switched SRS. Both the source component carrier and the target component carrier may be cross-carrier scheduled. For example, the value of $N_2$ may be calculated based on µ of Tables 1 and 2 for UE processing capability 1 and 2 respectively, where µ corresponds to one of a subcarrier spacing of the downlink with which the PDCCH was transmitted or a subcarrier spacing of the uplink with which the PUSCH is to be transmitted that results in the largest UE PUSCH preparation procedure time ($T_{proc,2}$). For instance, a value of µ in either table corresponding to a numerology with the smallest subcarrier spacing out of the various numerologies (e.g. µ=0) may be the worst-case carrier that results in the largest PUSCH preparation procedure time.

TABLE 1

PUSCH preparation time for PUSCH timing capability 1

| µ | PUSCH preparation time $N_2$ [symbols] |
|---|---|
| 0 | 10 |
| 1 | 12 |
| 2 | 23 |
| 3 | 36 |

TABLE 2

PUSCH preparation time for PUSCH timing capability 2

| µ | PUSCH preparation time $N_2$ [symbols] |
|---|---|
| 0 | 5 |
| 1 | 5.5 |
| 2 | 11 for frequency range 1 |

The UE may also transmit aperiodic SRS on a different carrier than that of an uplink transmission scheduled by the DCI (e.g. a carrier switched SRS). For instance, if the UE receives a PDCCH on a component carrier that schedules an uplink transmission on another component carrier, the UE may switch to a different component carrier to transmit SRS, or the UE may transmit the SRS in the same component carrier as that of the PDCCH triggering the SRS. The UE may interrupt another carrier transmission to transmit SRS on the different carrier, for example, when the UE has a single power amplifier that is moved between carriers. If the UE detects a positive SRS request on a grant for an n-th (n≥1) aperiodic SRS transmission on a cell c, the UE may commence the SRS transmission on a configured symbol and slot provided that the transmission is no earlier than the summation of: (a) a maximum time duration between the two durations spanned by N OFDM symbols of the numerology of the cell c and the cell carrying the grant respectively (e.g. corresponding to $N_2$ in one example or some other timing in other examples), and (b) the uplink or downlink radio frequency retuning time for switching carriers (referred to herein as switchingTime). The switching time may be defined by higher layer parameters switchingTimeUL and switchingTimeDL of srs-SwitchingTimeNR.

SRS carrier switching is typically not allowed in parallel with other carriers' uplink transmissions. Thus, the UE may not transmit a SRS on one carrier at the same time as another UE transmission (e.g. PUSCH, PUCCH, SRS, or PRACH) on a different carrier. This limitation may be based on UE capability information reported to the base station. For example, when the UE reports uplink component carrier parameters to the base station, the UE may indicate that it does not support simultaneous transmission of SRS on a supplemental uplink (SUL) carrier or a non-SUL carrier and PUSCH/PUCCH/SRS/PRACH on the other UL carrier in the same cell (e.g. in a parameter simultaneousTxSUL-NonSUL or another name). As a result, it is possible for collisions between such uplink transmissions and carrier-switched SRS to occur.

To handle these collisions, the UE may apply various rules to determine whether to prioritize a source carrier's uplink transmission over a carrier-switched SRS. In one rule, if the UE is scheduled to transmit a PUSCH, a PUCCH carrying an acknowledgement (ACK)/non-acknowledgment (NACK), or a positive scheduling request (SR), that uplink transmission takes priority over a carrier-switched SRS, and the UE drops the carrier-switched SRS. In another rule, if the UE is scheduled to transmit a PUSCH or a PUCCH carrying a rank indicator (RI) and/or a channel state information resource indicator (CRI), that uplink transmission takes priority over a carrier-switched SRS, and the UE drops the carrier-switched SRS. In another rule, if the UE is scheduled to transmit a PUSCH carrying aperiodic channel state information (CSI), that uplink transmission takes priority over a periodic or semi-persistent carrier-switched SRS, and the UE drops the carrier-switched SRS. In another rule, if the UE is scheduled to transmit a PUSCH carrying aperiodic CSI with only a channel quality indicator (CQI) or precoding matrix indicator (PMI), an aperiodic carrier-switched SRS takes priority over that uplink transmission, and the UE drops the uplink transmission. In another rule, if the UE is scheduled to transmit a PUSCH or PUCCH carrying periodic CSI with only CQI or PMI, a carrier-switched SRS (whether periodic, semi-persistent or aperiodic) takes priority over that uplink transmission, and the UE drops the uplink transmission. In another rule, if the UE is scheduled to transmit a PUSCH without uplink control information (UCI), a carrier-switched SRS takes priority over that uplink transmission, and the UE drops the uplink transmission. In another rule, if the UE is scheduled to transmit a physical random access channel (PRACH), that uplink transmission takes priority over a carrier-switched SRS, and the UE drops the carrier-switched SRS. In another rule, if the UE is scheduled to transmit a non-carrier switched SRS, a carrier-switched SRS takes priority over that uplink transmission, and the UE drops the uplink transmission. Thus, the UE may transmit or drop the carrier-switched SRS based on these conflict resolution rules in order to prevent collisions with the uplink transmission. However, the effectiveness of such conflict resolution rules depends on when the PDCCH scheduling the uplink transmission is received relative to the scheduled time for the carrier-switched SRS.

Figure 4:
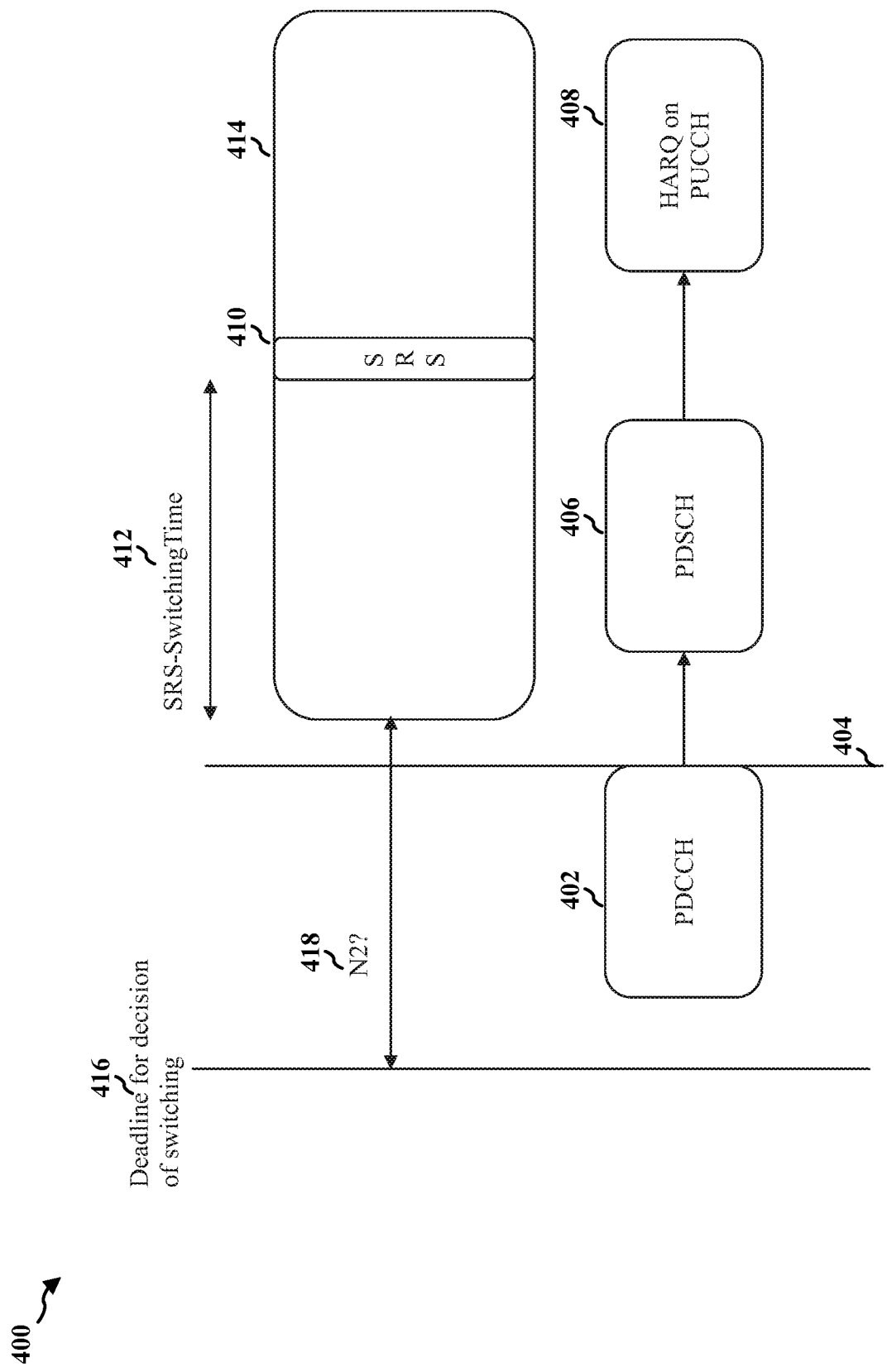
FIG. 4 is a diagram illustrating an example of a timeline for carrier-switched SRS transmission relative to an uplink transmission.

FIG. 4 illustrates an example 400 of a timeline for carrier-switched SRS transmission relative to an uplink transmission that may prevent the rules from effectively being applied. In this example, a UE receives a PDCCH 402 from a base station at reception time 404. The PDCCH 402 may include a DCI that schedules a PDSCH 406 including downlink data, which in turn may cause the UE to send a HARQ-ACK 408 on PUCCH in response to the PDSCH. Thus, the PDCCH from the base station may schedule the HARQ-ACK from the UE. The UE also receives a grant (not shown) from the base station that schedules a carrier-switched SRS 410 (e.g. an aperiodic SRS). In other examples, the carrier-switched SRS may be periodic (e.g. RRC configured) or semi-persistent (e.g. activated by PDSCH). The carrier-switched SRS 410 is scheduled to be transmitted on a different carrier than the HARQ-ACK, and thus includes a switching time 412 (e.g. switchingTime) for retuning to the different carrier prior to the SRS. The carrier-switched SRS 410 also includes a switching time 414 for retuning back to the source carrier after the SRS.

In this example, the carrier-switched SRS 410 overlaps with the HARQ-ACK 408. For example, the HARQ-ACK 408 may be scheduled to occur during at least one symbol within the switching time 414. In such case, the conflict resolution rules indicate the UE to drop the carrier-switched SRS 410 in favor of the uplink transmission (the HARQ-ACK 408). Yet, as described above for carrier-switched SRS, SRS transmissions commence on a configured symbol and slot provided that the transmission is no earlier than the summation of $N_2$ (or some other timing)+switchingTime. Thus, the UE commences transmission of the carrier-switched SRS by SRS decision time 416, which may be $N_2$ symbols 418 prior to switching time 412 and thus $N_2$+switchingTime symbols prior to the carrier-switched SRS 410. Since the SRS decision time 416 occurs prior to the reception time 404 for the PDCCH, the UE may not be aware at the time it commences the carrier-switched SRS that the HARQ-ACK will even be scheduled, and thus the UE cannot drop the SRS in favor of the uplink transmission per the conflict resolution rules. As a result, a conflict between the SRS and the HARQ-ACK may occur.

Aspects of the present disclosure address this problem by allowing the UE to determine whether to drop the SRS according to some conflict resolution rules, or the uplink transmission according to other conflict resolution rules, based on a timing between the reception time for the PDCCH and the SRS decision time. For example, if the UE receives a PDCCH no later than $N_2$+switchingTime symbols prior to the first symbol of the carrier-switched SRS, the UE may determine the uplink transmission scheduled by the PDCCH and apply one of the aforementioned conflict resolution rules accordingly. Examples of various uplink transmission scenarios are described below with respect to FIGS. 5-16. In this way, timing situations where conflicts may arise such as that described above with respect to FIG. 4 may be avoided.

Figure 5:
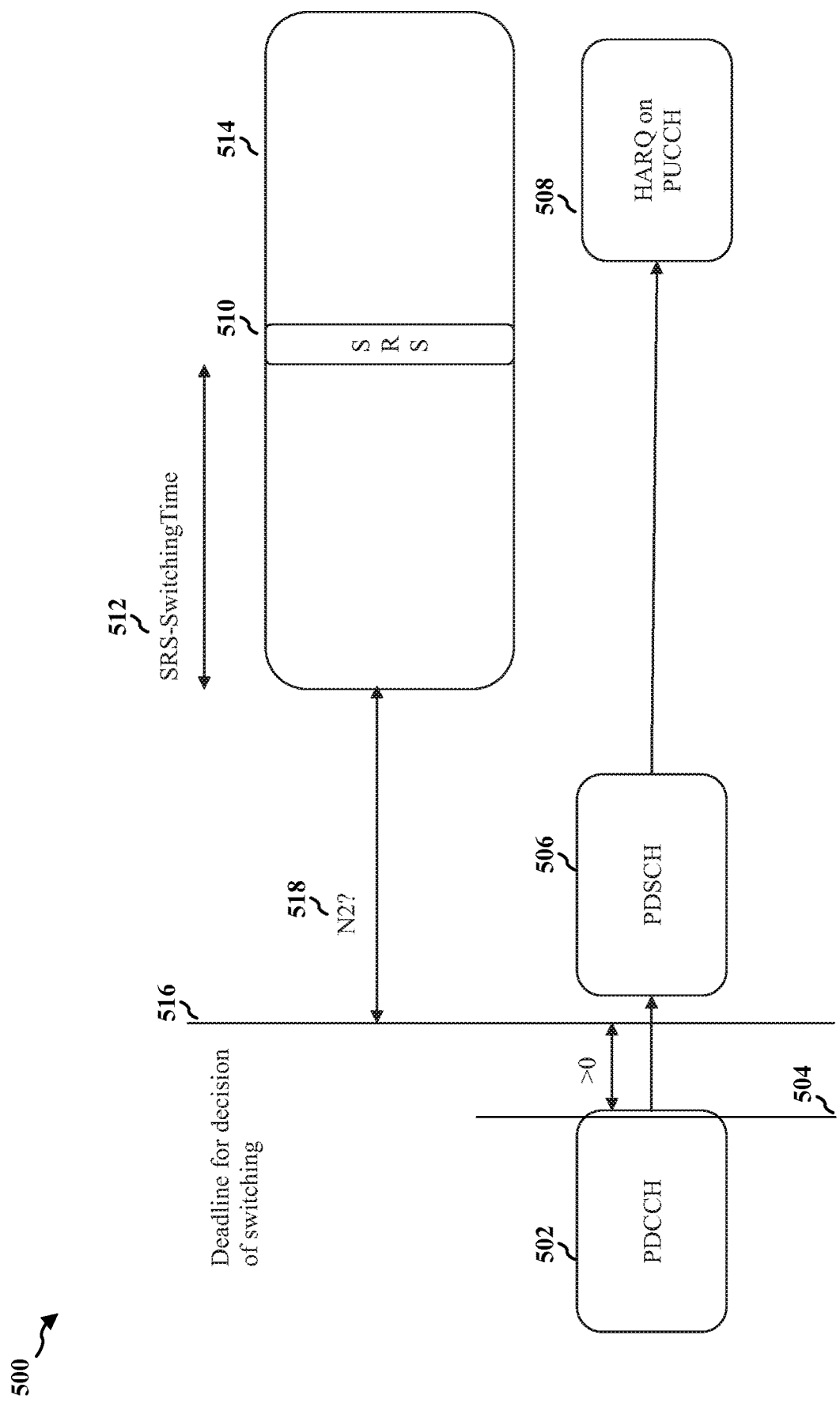
FIG. 5 is a diagram illustrating another example of a timeline for carrier-switched SRS transmission relative to an uplink transmission

FIG. 5 illustrates a timeline 500 for carrier-switched SRS transmission relative to one example of an uplink transmission, namely a HARQ-ACK corresponding to a dynamic grant. In this example, a UE receives a PDCCH 502 from a base station at reception time 504. The PDCCH 502 may include a DCI that schedules a PDSCH 506 including downlink data, which in turn may cause the UE to send a HARQ-ACK 508 on PUCCH in response to the PDSCH. Thus, the PDCCH from the base station may schedule the HARQ-ACK from the UE. The UE also receives a grant (not shown) from the base station that schedules a carrier-switched SRS 510 (e.g. an aperiodic SRS). In other examples, the carrier-switched SRS may be periodic (e.g. RRC configured) or semi-persistent (e.g. activated by PDSCH). The carrier-switched SRS 510 is scheduled to be transmitted on a different carrier than the HARQ-ACK, and thus includes a switching time 512 (e.g. switchingTime) for retuning to the different carrier prior to the SRS. The carrier-switched SRS 510 also includes a switching time 514 for retuning back to the source carrier after the SRS. SRS decision time 516 may be $N_2$ symbols 518 (or some other timing) prior to switching time 512 and thus $N_2$+switchingTime symbols prior to the carrier-switched SRS 510.

In this example, the reception time 504 for the PDCCH 502 scheduling the HARQ-ACK 508 is prior to (more than zero symbols before) the SRS decision time 516. Thus, prior to commencing SRS transmission, the UE may determine that the PDCCH is scheduling an uplink transmission (the HARQ-ACK 508) which overlaps with the carrier-switched SRS 510. For example, the UE may determine that the HARQ-ACK 508 illustrated in the example of FIG. 5 will be scheduled to occur during at least one symbol within the switching time 514. In such case, the conflict resolution rules indicate the UE to drop the carrier-switched SRS 510 in favor of the uplink transmission (the HARQ-ACK 508). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying HARQ-ACK happen to overlap in the same symbol and that can result in uplink transmissions beyond the UE's indicated uplink carrier aggregation capability. Thus, at SRS decision time 516, the UE may determine to drop the transmission of the carrier-switched SRS 510, thereby avoiding a conflict with the uplink transmission.

Figure 6:
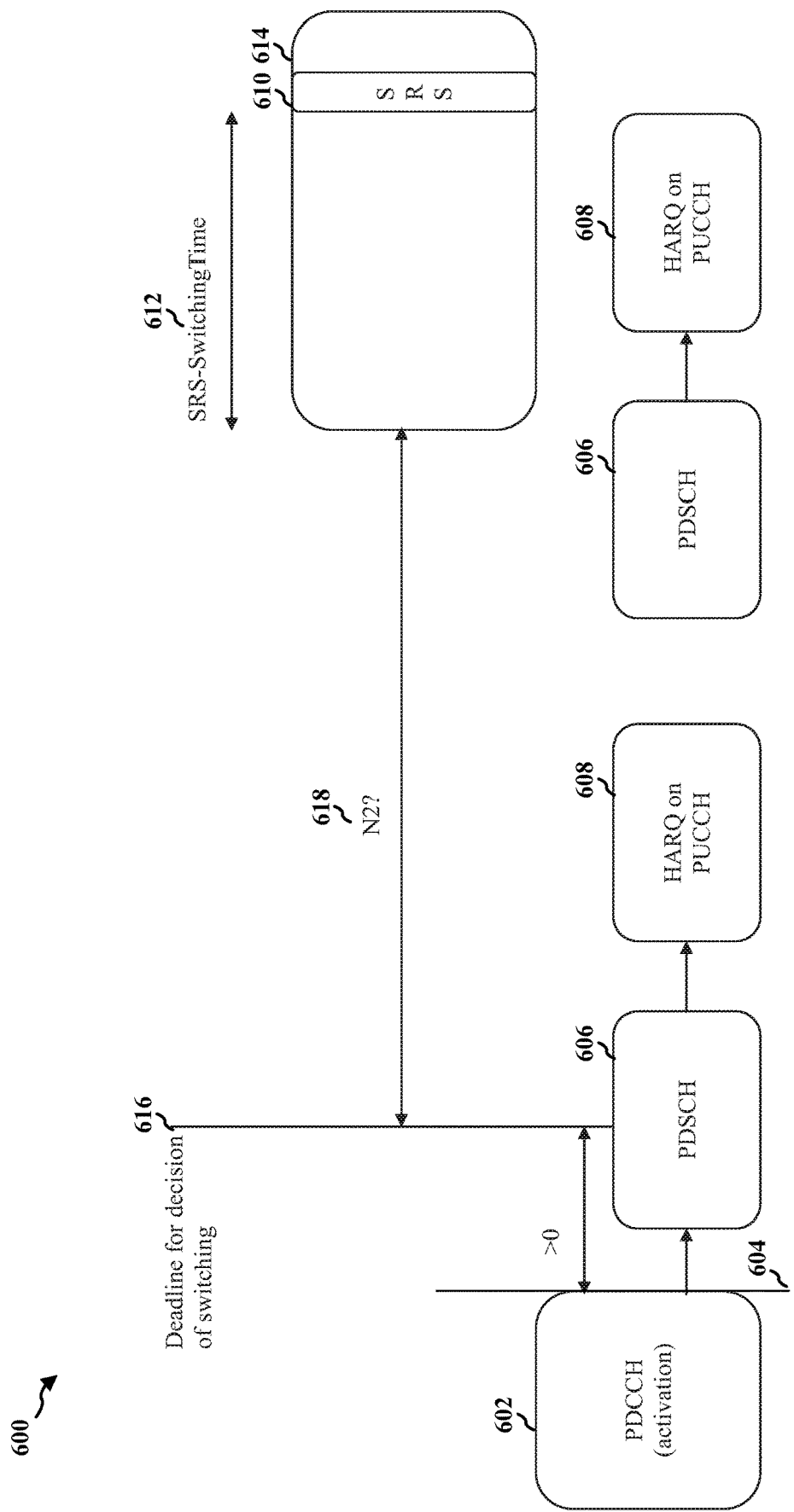
FIG. 6 is a diagram illustrating another example of a timeline for carrier-switched SRS transmission relative to an uplink transmission.

FIG. 6 illustrates a timeline 600 for carrier-switched SRS transmission relative to another example of an uplink transmission, namely a semi-persistently scheduled (SPS) HARQ-ACK. In this example, a UE receives a PDCCH 602 from a base station at reception time 604. The PDCCH 602 may include a DCI that activates SPS PDSCH and HARQ-ACK. For example, the PDCCH may include a DCI that schedules semi-persistent PDSCH 606 including downlink data, which in turn may cause the UE to send semi-persistent HARQ-ACK 608 on PUCCH in response to each PDSCH. Thus, the PDCCH from the base station may schedule the SPS HARQ-ACK from the UE. The UE also receives a grant (not shown) from the base station that schedules a carrier-switched SRS 610 (e.g. an aperiodic SRS). In other examples, the carrier-switched SRS may be periodic (e.g. RRC configured) or semi-persistent (e.g. activated by PDSCH). The carrier-switched SRS 610 is scheduled to be transmitted on a different carrier than the SPS HARQ-ACK, and thus includes a switching time 612 (e.g. switchingTime) for retuning to the different carrier prior to the SRS. The carrier-switched SRS 610 also includes a switching time 614 for retuning back to the source carrier after the SRS. While FIG. 6 illustrates switching time 614 as being smaller than switching time 414 and 514 in FIGS. 4 and 5, this change is merely for ease of illustration and it should be noted that the switching time 614 may generally be the same as that of switching time 414 and 514. SRS decision time 616 may be $N_2$ symbols 618 (or some other timing) prior to switching time 612 and thus $N_2$+switchingTime symbols prior to the carrier-switched SRS 610.

In this example, the reception time 604 for the PDCCH 602 scheduling the SPS HARQ-ACK 608 is prior to (more than zero symbols before) the SRS decision time 616. Thus, prior to commencing SRS transmission, the UE may determine that the PDCCH is scheduling an uplink transmission (the SPS HARQ-ACK 608) which overlaps with the carrier-switched SRS 610. For example, the UE may determine that the second SPS HARQ-ACK illustrated in the example of FIG. 6 will be scheduled to occur during at least one symbol within the switching time 612. In such case, the conflict resolution rules indicate the UE to drop the carrier-switched SRS 610 in favor of the uplink transmission (the SPS HARQ-ACK 608). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying HARQ-ACK happen to overlap in the same symbol and that can result in uplink transmissions beyond the UE's indicated uplink carrier aggregation capability. Thus, at SRS decision time 616, the UE may determine to drop the transmission of the carrier-switched SRS 610, thereby avoiding a conflict with the uplink transmission.

Figure 7:
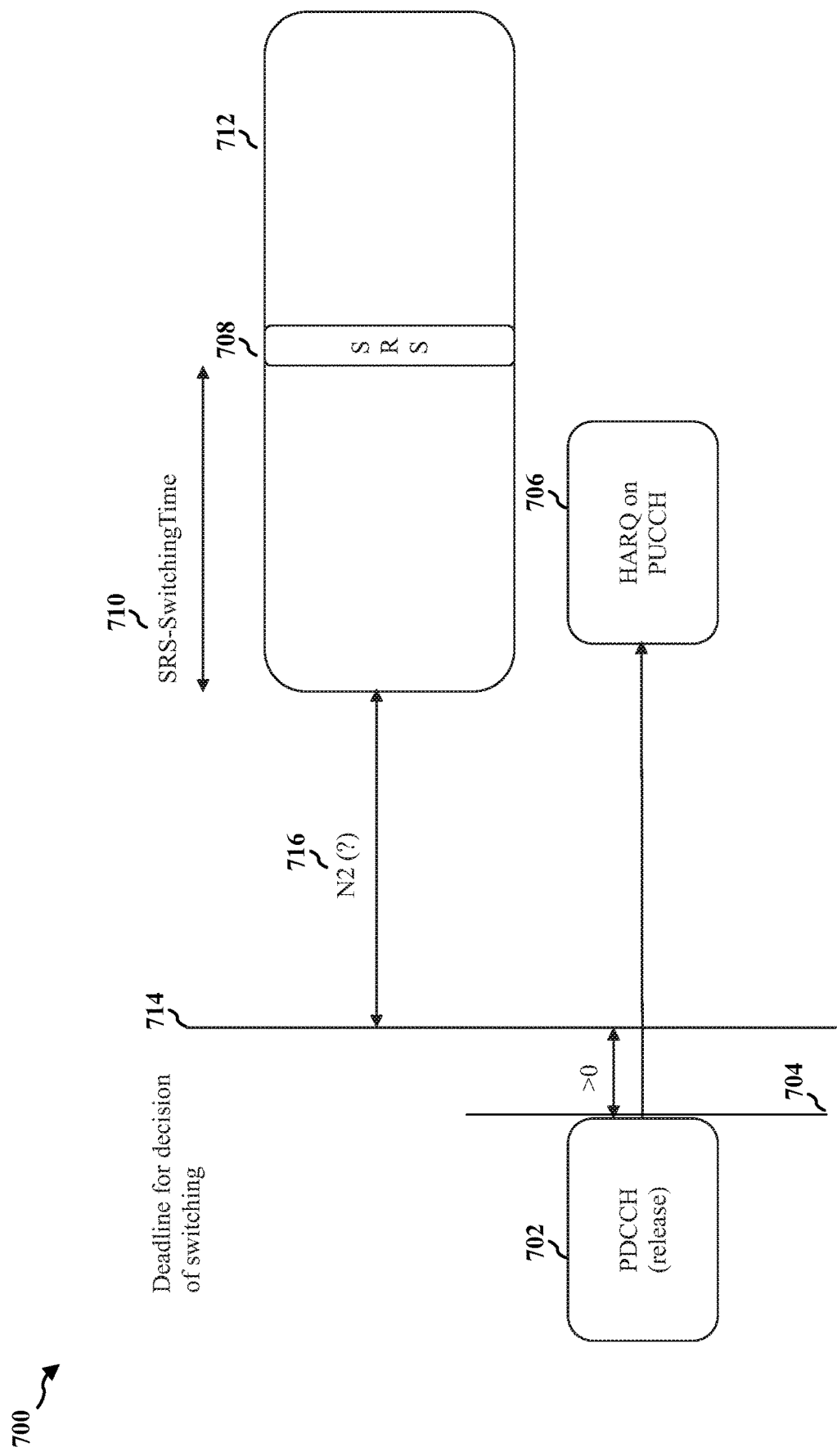
FIG. 7 is a diagram illustrating an example of a timeline for carrier-switched SRS transmission relative to an uplink transmission.

FIG. 7 illustrates a timeline 700 for carrier-switched SRS transmission relative to another example of an uplink transmission, namely a SPS release HARQ-ACK. In this example, a UE receives a PDCCH 702 from a base station at reception time 704. The PDCCH 702 may include a DCI that deactivates or releases SPS PDSCH and HARQ-ACK. For example, the PDCCH may include a DCI that releases the prior semi-persistent scheduling illustrated in the example of FIG. 6, which in turn may cause the UE to send a HARQ-ACK 706 on PUCCH in response to the PDCCH. Thus, the PDCCH from the base station may schedule the SPS release HARQ-ACK from the UE. The UE also receives a grant (not shown) from the base station that schedules a carrier-switched SRS 708 (e.g. an aperiodic SRS). In other examples, the carrier-switched SRS may be periodic (e.g. RRC configured) or semi-persistent (e.g. activated by PDSCH). The carrier-switched SRS 708 is scheduled to be transmitted on a different carrier than the SPS HARQ-ACK, and thus includes a switching time 710 (e.g. switchingTime) for retuning to the different carrier prior to the SRS. The carrier-switched SRS 708 also includes a switching time 712 for retuning back to the source carrier after the SRS. SRS decision time 714 may be $N_2$ symbols 716 (or some other timing) prior to switching time 710 and thus $N_2$+switchingTime symbols prior to the carrier-switched SRS 708.

In this example, the reception time 704 for the PDCCH 702 scheduling the SPS release HARQ-ACK 706 is prior to (more than zero symbols before) the SRS decision time 714. Thus, prior to commencing SRS transmission, the UE may determine that the PDCCH is scheduling an uplink transmission (the SPS release HARQ-ACK 706) which overlaps with the carrier-switched SRS 708. For example, the UE may determine that the SPS release HARQ-ACK illustrated in the example of FIG. 7 will be scheduled to occur during at least one symbol within the switching time 710. In such case, the conflict resolution rules indicate the UE to drop the carrier-switched SRS 708 in favor of the uplink transmission (the SPS release HARQ-ACK 706). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying HARQ-ACK happen to overlap in the same symbol and that can result in uplink transmissions beyond the UE's indicated uplink carrier aggregation capability. Thus, at SRS decision time 714, the UE may determine to drop the transmission of the carrier-switched SRS 708, thereby avoiding a conflict with the uplink transmission.

Figure 8:
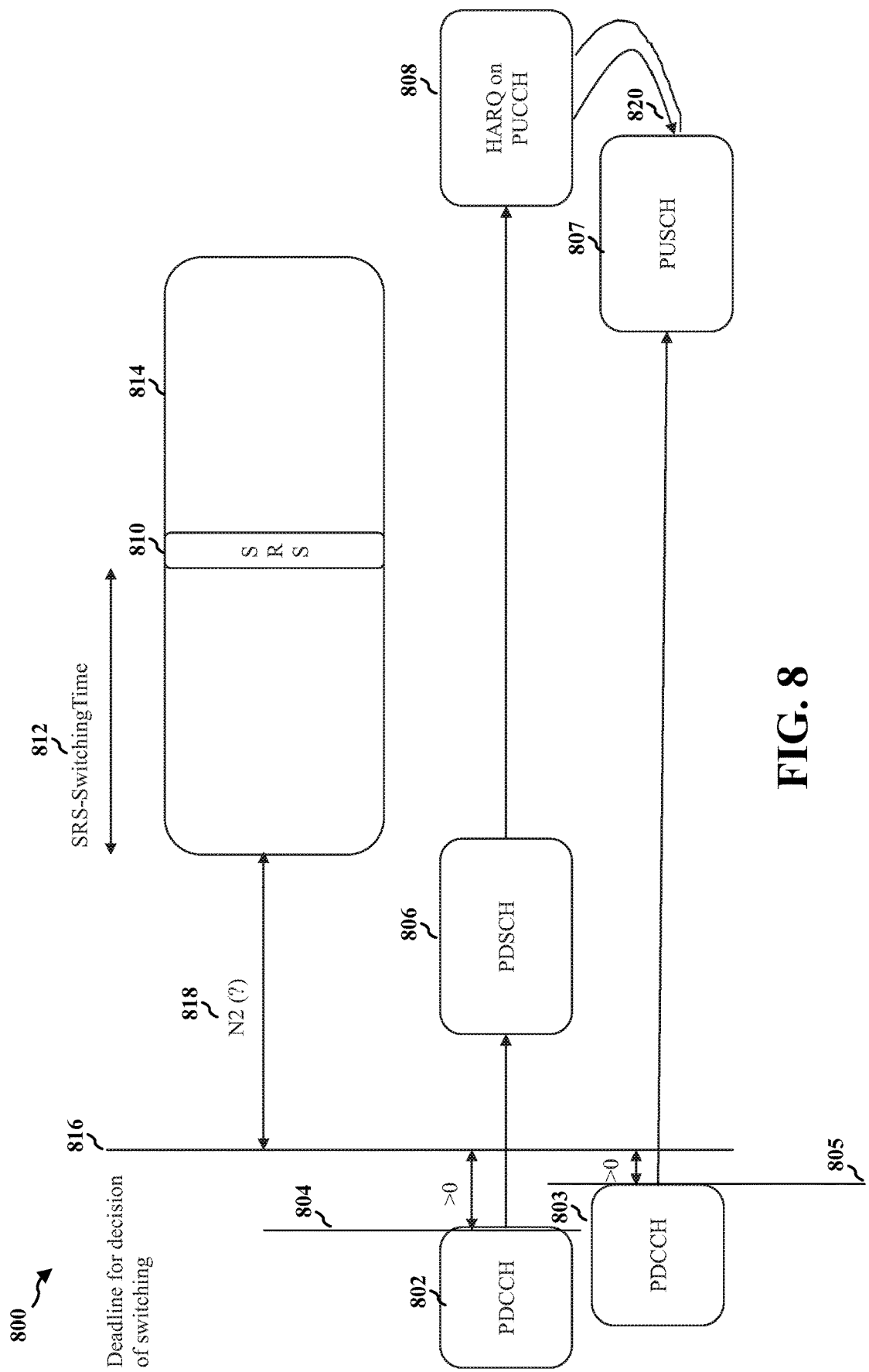
FIG. 8 is a diagram illustrating another example of a timeline for carrier-switched SRS transmission relative to an uplink transmission.

FIG. 8 illustrates a timeline 800 for carrier-switched SRS transmission relative to another example of an uplink transmission, namely a HARQ-ACK multiplexed on PUSCH. In this example, a UE receives a first PDCCH 802 from a base station at reception time 804 and a second PDCCH 803 from the base station at reception time 805. The first PDCCH 802 may include a DCI that schedules a PDSCH 806 including downlink data, which in turn may cause the UE to send a HARQ-ACK 808 on PUCCH in response to the PDSCH. Thus, the first PDCCH from the base station may schedule the HARQ-ACK from the UE. Moreover, the second PDCCH 803 may schedule a PUSCH 807 including uplink data of the UE. The UE also receives a grant (not shown) from the base station that schedules a carrier-switched SRS 810 (e.g. an aperiodic SRS). In other examples, the carrier-switched SRS may be periodic (e.g. RRC configured) or semi-persistent (e.g. activated by PDSCH). The carrier-switched SRS 810 is scheduled to be transmitted on a different carrier than the HARQ-ACK, and thus includes a switching time 812 (e.g. switchingTime) for retuning to the different carrier prior to the SRS. The carrier-switched SRS 810 also includes a switching time 814 for retuning back to the source carrier after the SRS. SRS decision time 816 may be $N_2$ symbols 818 (or some other timing) prior to switching time 812 and thus $N_2$+switchingTime symbols prior to the carrier-switched SRS 810.

In this example, the reception time 804 for the first PDCCH 802 scheduling the HARQ-ACK 808 and the reception time 805 for the second PDCCH 803 scheduling the PUSCH 807 are prior to (more than zero symbols before) the SRS decision time 816. Thus, prior to commencing SRS transmission, the UE may determine that the PUSCH 807 overlaps in time with the HARQ-ACK 808 on PUCCH, such as illustrated in FIG. 8. Therefore, the UE may determine that the HARQ-ACK 808 is to be multiplexed (at 820) with the PUSCH 807. Accordingly, the UE may determine that the first PDCCH 802 is scheduling an uplink transmission (the HARQ-ACK 808) which overlaps with the carrier-switched SRS 810. For example, the UE may determine that the HARQ-ACK 808 illustrated in the example of FIG. 8 will be scheduled to occur during at least one symbol within the switching time 814 due to the multiplexing at 820, as indicated in FIG. 8. In such case, the conflict resolution rules indicate the UE to drop the carrier-switched SRS 810 in favor of the uplink transmission (the HARQ-ACK 808). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying HARQ-ACK happen to overlap in the same symbol and that can result in uplink transmissions beyond the UE's indicated uplink carrier aggregation capability. Thus, at SRS decision time 816, the UE may determine to drop the transmission of the carrier-switched SRS 810, thereby avoiding a conflict with the uplink transmission.

Figure 9:
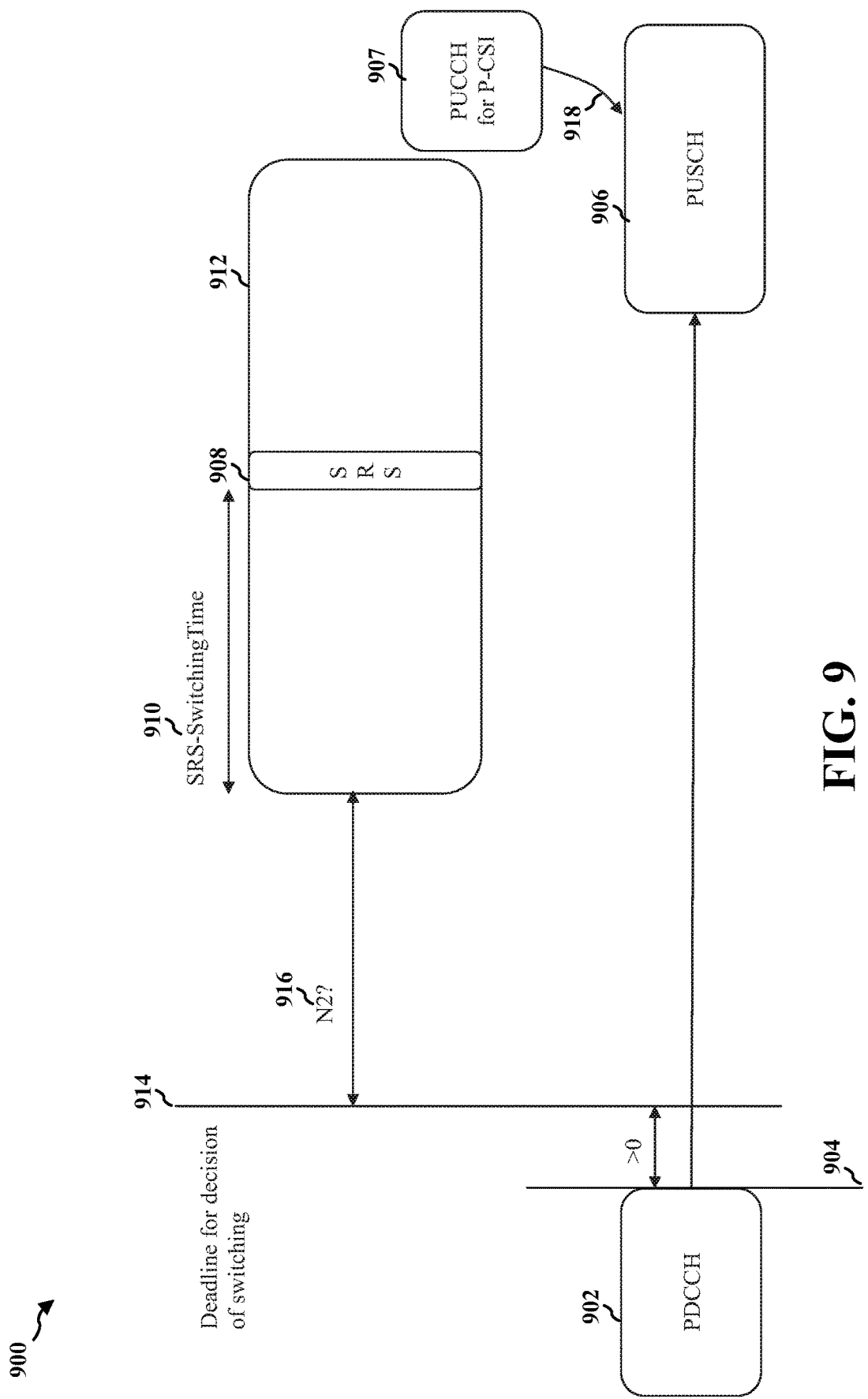
FIG. 9 is a diagram illustrating another example of a timeline for carrier-switched SRS transmission relative to an uplink transmission.

FIG. 9 illustrates a timeline 900 for carrier-switched SRS transmission relative to one example of an uplink transmission, namely periodic channel state information (P-CSI) on a PUSCH or SPS CSI on a PUCCH. In this example, a UE receives a PDCCH 902 from a base station at reception time 904. The PDCCH 902 may include a DCI that schedules a PUSCH 906 including uplink data. The base station may also previously schedule the UE to transmit P-CSI on PUCCH 907. The P-CSI may include a RI or a CRI. The UE also receives a grant (not shown) from the base station that schedules a carrier-switched SRS 908 (e.g. an aperiodic SRS). In other examples, the carrier-switched SRS may be periodic (e.g. RRC configured) or semi-persistent (e.g. activated by PDSCH). The carrier-switched SRS 908 is scheduled to be transmitted on a different carrier than the P-CSI, and thus includes a switching time 910 (e.g. switchingTime) for retuning to the different carrier prior to the SRS. The carrier-switched SRS 908 also includes a switching time 912 for retuning back to the source carrier after the SRS. SRS decision time 914 may be $N_2$ symbols 916 (or some other timing) prior to switching time 910 and thus $N_2$+switchingTime symbols prior to the carrier-switched SRS 908.

In this example, the reception time 904 for the PDCCH 902 scheduling the PUSCH 906 is prior to (more than zero symbols before) the SRS decision time 914. Thus, prior to commencing SRS transmission, the UE may determine that the PUSCH 906 overlaps in time with the scheduled P-CSI on PUCCH 907, such as illustrated in FIG. 9. Therefore, the UE may determine that the P-CSI on PUCCH 907 is to be multiplexed (at 918) with the PUSCH 906. Accordingly, the UE may determine that the PDCCH 902 is scheduling an uplink transmission (the PUSCH 906 including multiplexed P-CSI) which overlaps with the carrier-switched SRS 908. For example, the UE may determine that the P-CSI illustrated in the example of FIG. 9 will be scheduled to occur during at least one symbol within the switching time 912 due to the multiplexing at 918, as indicated in FIG. 9. In such case, the conflict resolution rules indicate the UE to drop the carrier-switched SRS 908 in favor of the uplink transmission (the P-CSI). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying RI or CRI happen to overlap in the same symbol and that can result in uplink transmissions beyond the UE's indicated uplink carrier aggregation capability. Thus, at SRS decision time 914, the UE may determine to drop the transmission of the carrier-switched SRS 908, thereby avoiding a conflict with the uplink transmission.

Figure 10:
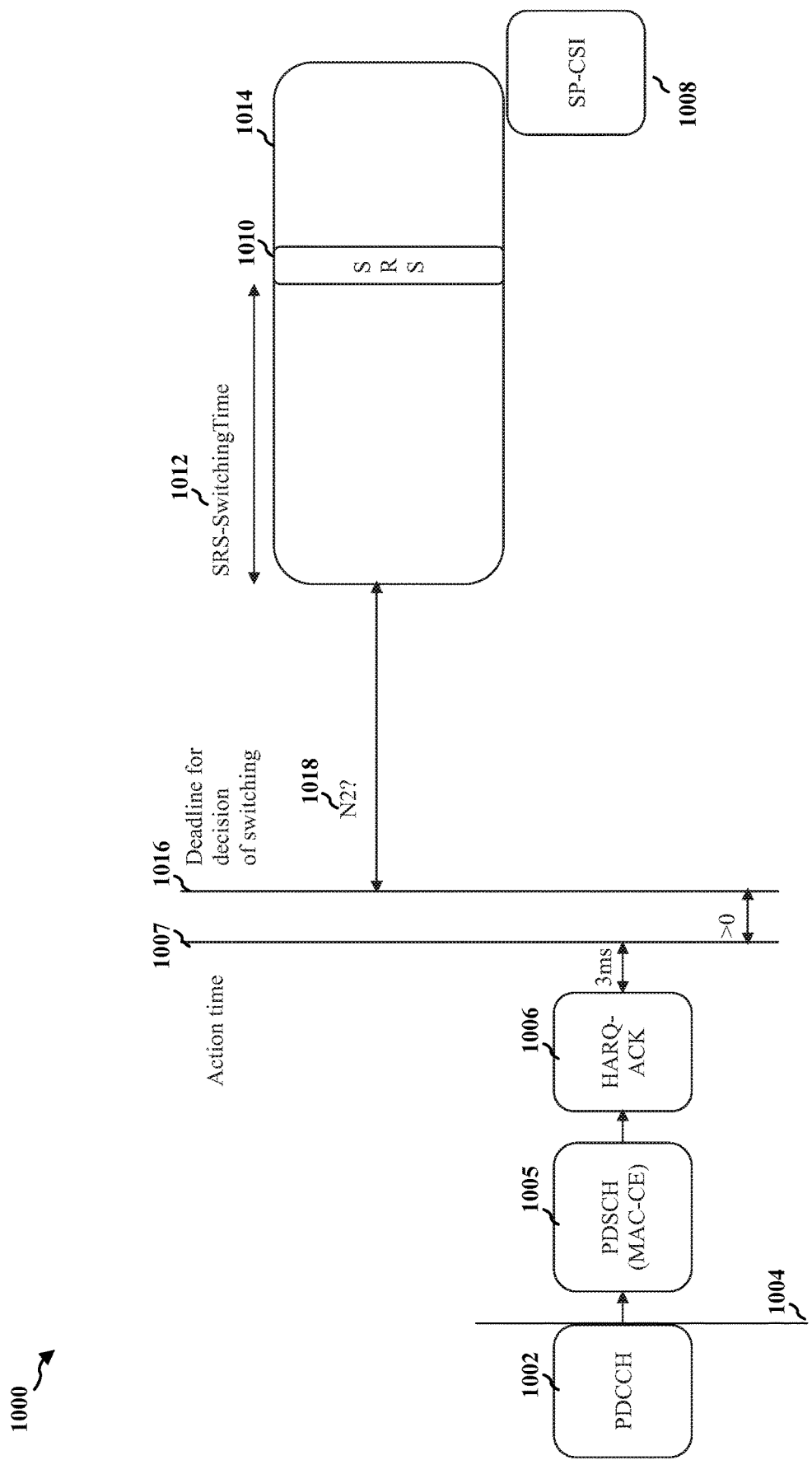
FIG. 10 is a diagram illustrating another example of a timeline for carrier-switched SRS transmission relative to an uplink transmission.

FIG. 10 illustrates a timeline 1000 for carrier-switched SRS transmission relative to another example of an uplink transmission, namely a semi-persistently scheduled CSI (SP-CSI). In this example, a UE receives a PDCCH 1002 from a base station at reception time 1004. The PDCCH 1002 may include a DCI that schedules a PDSCH 1005, which in turn may include a MAC-CE that activates SP-CSI and causes the UE to send HARQ-ACK 1006 in response to the PDSCH. At an action time 1007 subsequent to the HARQ-ACK (e.g. 3 ms after sending the HARQ-ACK), the UE may commence sending SP-CSI 1008 including RI or CRI. Thus, the PDCCH from the base station may schedule the SP-CSI from the UE beginning at action time 1007. The UE also receives a grant (not shown) from the base station that schedules a carrier-switched SRS 1010 (e.g. an aperiodic SRS). In other examples, the carrier-switched SRS may be periodic (e.g. RRC configured) or semi-persistent (e.g. activated by PDSCH). The carrier-switched SRS 1010 is scheduled to be transmitted on a different carrier than the SP-CSI, and thus includes a switching time 1012 (e.g. switchingTime) for retuning to the different carrier prior to the SRS. The carrier-switched SRS 1010 also includes a switching time 1014 for retuning back to the source carrier after the SRS. SRS decision time 1016 may be $N_2$ symbols 1018 (or some other timing) prior to switching time 1012 and thus $N_2$+switchingTime symbols prior to the carrier-switched SRS 1010.

In this example, the action time 1007 is prior to (more than zero symbols before) the SRS decision time 1016. Thus, prior to commencing SRS transmission, the UE may determine that the PDCCH is scheduling an uplink transmission (the SP-CSI 1008) which overlaps with the carrier-switched SRS 1010. For example, the UE may determine that the SP-CSI 1008 illustrated in the example of FIG. 10 will be scheduled to occur during at least one symbol within the switching time 1014. In such case, the conflict resolution rules indicate the UE to drop the carrier-switched SRS 1010 in favor of the uplink transmission (the SP-CSI 1008). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying RI or CRI happen to overlap in the same symbol and that can result in uplink transmissions beyond the UE's indicated uplink carrier aggregation capability. Thus, at SRS decision time 1016, the UE may determine to drop the transmission of the carrier-switched SRS 1010, thereby avoiding a conflict with the uplink transmission.

Figure 11:
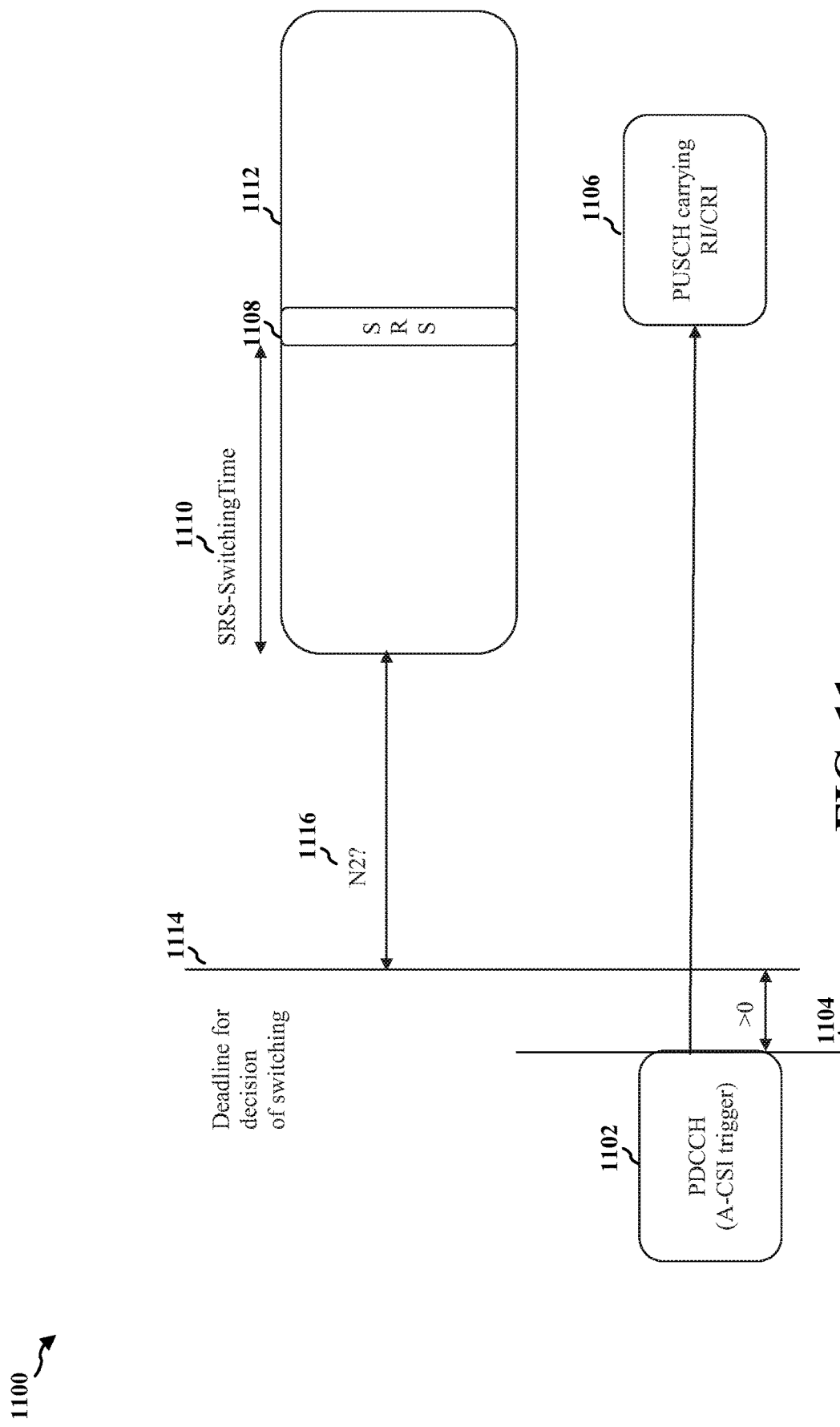
FIG. 11 is a diagram illustrating another example of a timeline for carrier-switched SRS transmission relative to an uplink transmission.

FIG. 11 illustrates a timeline 1100 for carrier-switched SRS transmission relative to another example of an uplink transmission, namely aperiodic channel state information (A-CSI) on a PUSCH when the carrier-switched SRS is aperiodic. In this example, a UE receives a PDCCH 1102 from a base station at reception time 1104. The PDCCH 1102 may include a DCI that schedules or triggers a PUSCH 1106 including A-CSI, which includes RI or CRI. The UE also receives a grant (not shown) from the base station that schedules a carrier-switched SRS 1108 (e.g. an aperiodic SRS). The carrier-switched SRS 1108 is scheduled to be transmitted on a different carrier than the A-CSI, and thus includes a switching time 1110 (e.g. switchingTime) for retuning to the different carrier prior to the SRS. The carrier-switched SRS 1108 also includes a switching time 1112 for retuning back to the source carrier after the SRS. SRS decision time 1114 may be $N_2$ symbols 1116 (or some other timing) prior to switching time 1110 and thus $N_2$+switchingTime symbols prior to the carrier-switched SRS 1108.

In this example, the reception time 1104 for the PDCCH 1102 scheduling the PUSCH 1106 is prior to (more than zero symbols before) the SRS decision time 1114. Thus, prior to commencing SRS transmission, the UE may determine that the PDCCH 1102 is scheduling an uplink transmission (the PUSCH 1106 including A-CSI) which overlaps with the carrier-switched SRS 1108. For example, the UE may determine that the A-CSI illustrated in the example of FIG. 11 will be scheduled to occur during at least one symbol within the carrier-switched SRS 1108 or switching time 1112. In such case, the conflict resolution rules indicate the UE to drop the carrier-switched SRS 1108 in favor of the uplink transmission (the A-CSI). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PUSCH/PUCCH transmission carrying RI or CRI happen to overlap in the same symbol and that can result in uplink transmissions beyond the UE's indicated uplink carrier aggregation capability. Thus, at SRS decision time 1114, the UE may determine to drop the transmission of the carrier-switched SRS 1108, thereby avoiding a conflict with the uplink transmission.

Figure 12:
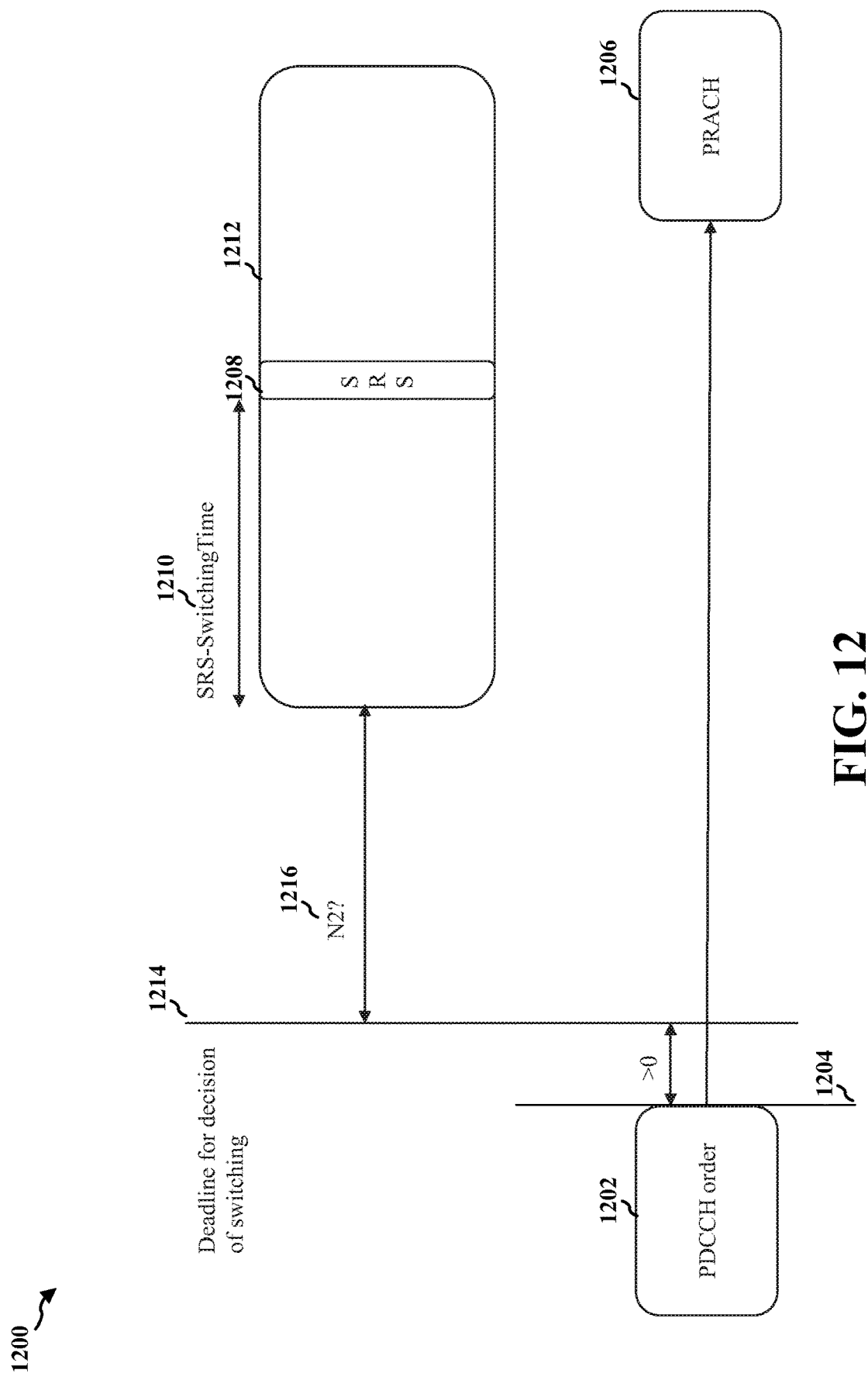
FIG. 12 is a diagram illustrating an example of a timeline for carrier-switched SRS transmission relative to an uplink transmission.

FIG. 12 illustrates a timeline 1200 for carrier-switched SRS transmission relative to another example of an uplink transmission, namely a PRACH. In this example, a UE receives a PDCCH 1202 from a base station at reception time 1204. The PDCCH 1202 may include a PDCCH order that schedules a PRACH 1206. The UE also receives a grant (not shown) from the base station that schedules a carrier-switched SRS 1208 (e.g. an aperiodic SRS). In other examples, the carrier-switched SRS may be periodic (e.g. RRC configured) or semi-persistent (e.g. activated by PDSCH). The carrier-switched SRS 1208 is scheduled to be transmitted on a different carrier than the PRACH, and thus includes a switching time 1210 (e.g. switchingTime) for retuning to the different carrier prior to the SRS. The carrier-switched SRS 1208 also includes a switching time 1212 for retuning back to the source carrier after the SRS. SRS decision time 1214 may be $N_2$ symbols 1216 (or some other timing) prior to switching time 1210 and thus $N_2$+switchingTime symbols prior to the carrier-switched SRS 1208.

In this example, the reception time 1204 for the PDCCH 1202 scheduling the PRACH 1206 is prior to (more than zero symbols before) the SRS decision time 1214. Thus, prior to commencing SRS transmission, the UE may determine that the PDCCH 1202 is scheduling an uplink transmission (the PRACH 1206) which overlaps with the carrier-switched SRS 1208. For example, the UE may determine that the PRACH illustrated in the example of FIG. 12 will be scheduled to occur during at least one symbol within the switching time 1212. In such case, the conflict resolution rules indicate the UE to drop the carrier-switched SRS 1208 in favor of the uplink transmission (the PRACH). For example, the UE may determine that, for a carrier of a serving cell with slot formats comprised of DL and UL symbols, not configured for PUSCH/PUCCH transmission, the UE may not transmit SRS whenever SRS transmission (including any interruption due to uplink or downlink RF retuning time as defined by higher layer parameters switchingTimeUL and switchingTimeDL of srs-SwitchingTimeNR) on the carrier of the serving cell and PRACH happen to overlap in the same symbol and that can result in uplink transmissions beyond the UE's indicated uplink carrier aggregation capability. Thus, at SRS decision time 1214, the UE may determine to drop the transmission of the carrier-switched SRS 1208, thereby avoiding a conflict with the uplink transmission.

Figure 13:
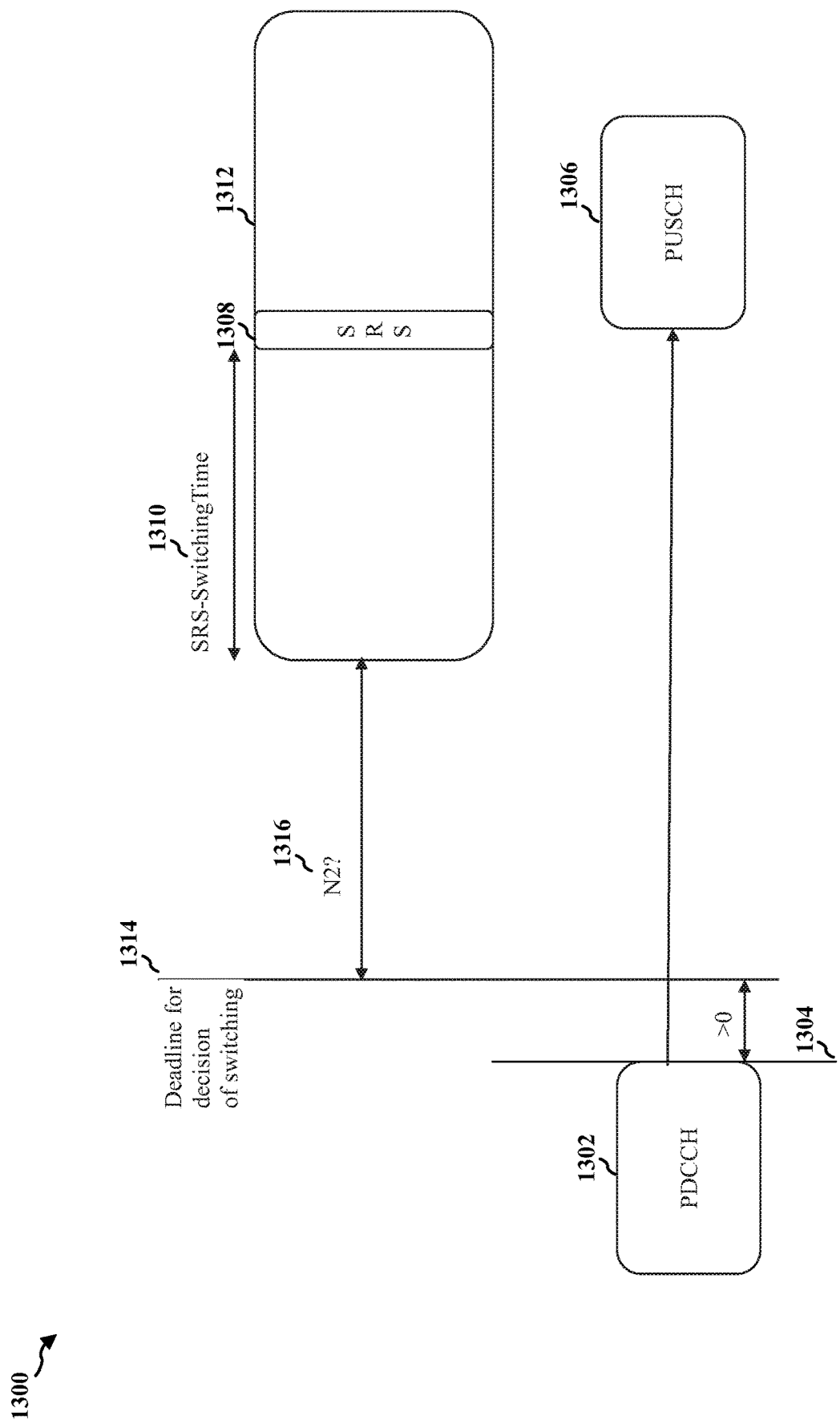
FIG. 13 is a diagram illustrating another example of a timeline for carrier-switched SRS transmission relative to an uplink transmission.

FIG. 13 illustrates a timeline 1300 for carrier-switched SRS transmission relative to another example of an uplink transmission, namely A-CSI on a PUSCH when the carrier-switched SRS is periodic or semi-persistent. In this example, a UE receives a PDCCH 1302 from a base station at reception time 1304. The PDCCH 1302 may include a DCI that schedules or triggers a PUSCH 1306 including A-CSI. The UE is also configured with a carrier-switched SRS 1308, which may be periodic (e.g. RRC configured) or semi-persistent (e.g. activated by PDSCH). The carrier-switched SRS 1308 is scheduled to be transmitted on a different carrier than the A-CSI, and thus includes a switching time 1310 (e.g. switchingTime) for retuning to the different carrier prior to the SRS. The carrier-switched SRS 1308 also includes a switching time 1312 for retuning back to the source carrier after the SRS. SRS decision time 1314 may be $N_2$ symbols 1316 (or some other timing) prior to switching time 1310 and thus $N_2$+switchingTime symbols prior to the carrier-switched SRS 1308.

In this example, the reception time 1304 for the PDCCH 1302 scheduling the PUSCH 1306 is prior to (more than zero symbols before) the SRS decision time 1314. Thus, prior to commencing SRS transmission, the UE may determine that the PDCCH 1302 is scheduling an uplink transmission (the PUSCH 1306 including A-CSI) which overlaps with the carrier-switched SRS 1308. For example, the UE may determine that the A-CSI illustrated in the example of FIG. 13 will be scheduled to occur during at least one symbol within the carrier-switched SRS 1308 or the switching time 1312. In such case, the conflict resolution rules indicate the UE to drop the carrier-switched SRS 1308 in favor of the uplink transmission (the A-CSI). For example, the UE may determine that, for a carrier of a serving cell with slot formats comprised of DL and UL symbols, not configured for PUSCH/PUCCH transmission, the UE may not transmit a periodic/semi-persistent SRS whenever periodic/semi-persistent SRS transmission (including any interruption due to uplink or downlink RF retuning time as defined by higher layer parameters switchingTimeUL and switchingTimeDL of srs-SwitchingTimeNR) on the carrier of the serving cell and PUSCH transmission carrying aperiodic CSI happen to overlap in the same symbol and that can result in uplink transmissions beyond the UE's indicated uplink carrier aggregation capability. Thus, at SRS decision time 1314, the UE may determine to drop the transmission of the carrier-switched SRS 1308, thereby avoiding a conflict with the uplink transmission.

Figure 14:
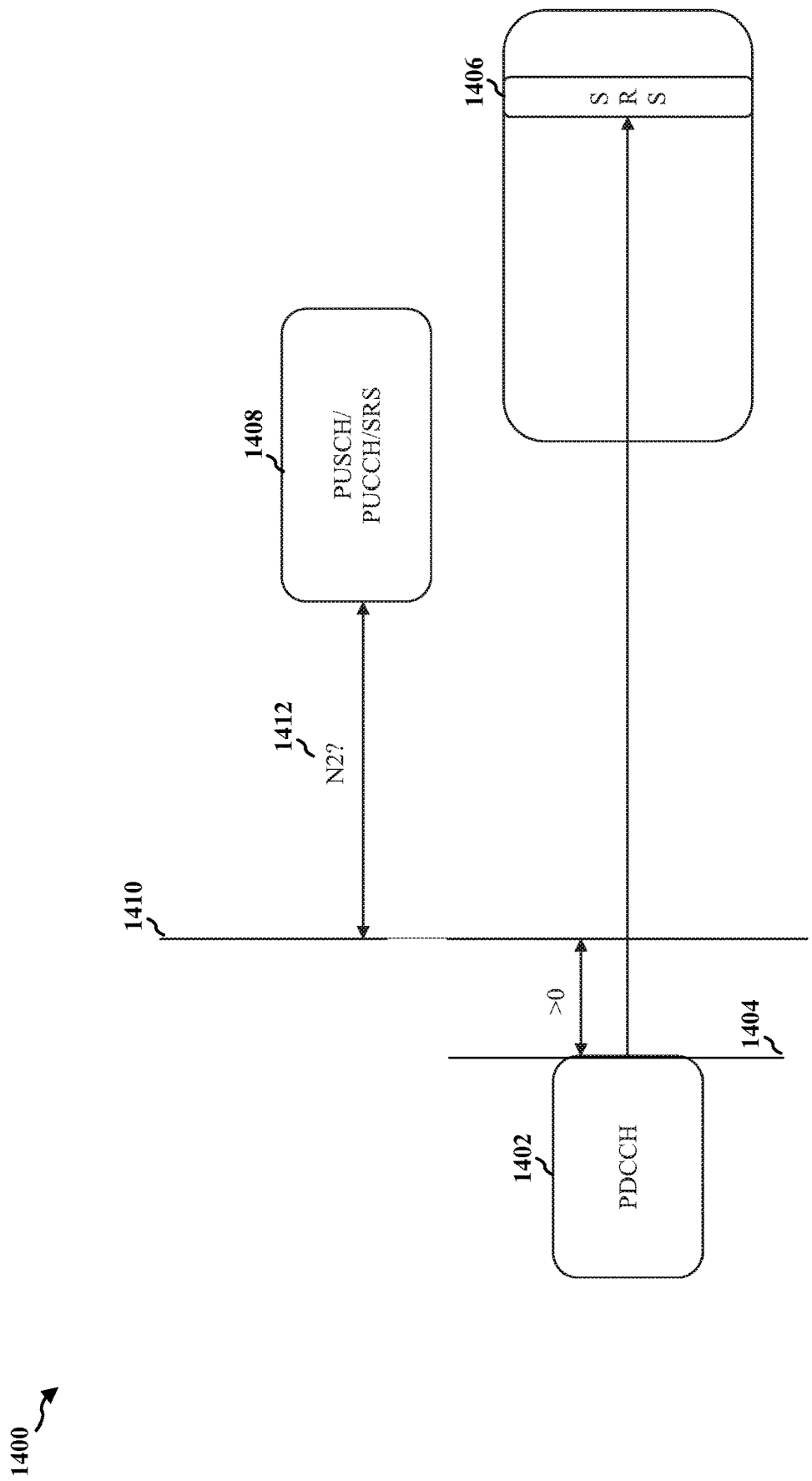
FIG. 14 is a diagram illustrating another example of a timeline for carrier-switched SRS transmission relative to an uplink transmission.

FIG. 14 illustrates a timeline 1400 for carrier-switched SRS transmission relative to other examples of an uplink transmission, including P-CSI (on PUCCH or PUSCH), a non-carrier-switched SRS, or a PUSCH not carrying UCI, when the carrier-switched SRS is aperiodic. In this example, a UE receives a PDCCH 1402 from a base station at reception time 1404. The PDCCH 1402 schedules or triggers a carrier-switched SRS 1406. The carrier-switched SRS may be aperiodic. The UE also receives a PDCCH (not shown) that may include a DCI that schedules an uplink transmission 1408 such as a PUSCH or PUCCH, including P-CSI with only CQI or PMI, a non-carrier switched SRS, or PUSCH not carrying UCI. The carrier-switched SRS 1406 is scheduled to be transmitted on a different carrier than the uplink transmission 1408. SRS decision time 1410 may be $N_2$ symbols 1412 (or some other timing) prior to the uplink transmission 1408.

In this example, the reception time 1404 for the PDCCH 1402 scheduling the carrier-switched SRS 1406 is prior to (more than zero symbols before) the SRS decision time 1410. Thus, prior to commencing SRS transmission, the UE may determine that a PDCCH (not shown) is scheduling an uplink transmission (the uplink transmission 1408) which overlaps with the carrier-switched SRS 1406. For example, the UE may determine that the uplink transmission illustrated in the example of FIG. 14 will be scheduled to occur during at least one symbol within a switching time for the carrier-switched SRS 1406. In such case, the conflict resolution rules indicate the UE to drop the uplink transmission 1408 (the P-CSI with only CQI/PMI, the non-carrier switched SRS, or the PUSCH not carrying UCI) in favor of carrier-switched SRS 1406. For example, the UE may determine that, for a carrier of a serving cell with slot formats comprised of DL and UL symbols, not configured for PUSCH/PUCCH transmission, the UE may drop PUCCH/PUSCH transmission carrying periodic CSI comprising only CQI/PMI, PUSCH not carrying UCI, and/or SRS transmission on another serving cell configured for PUSCH/PUCCH transmission whenever the transmission and SRS transmission (including any interruption due to uplink or downlink RF retuning time as defined by higher layer parameters switchingTimeUL and switchingTimeDL of srs-SwitchingTimeNR) on the serving cell happen to overlap in the same symbol and that can result in uplink transmissions beyond the UE's indicated uplink carrier aggregation capability. Thus, at SRS decision time 1410, the UE may determine to drop the uplink transmission 1408, thereby avoiding a conflict with the carrier-switched SRS.

Figure 15:
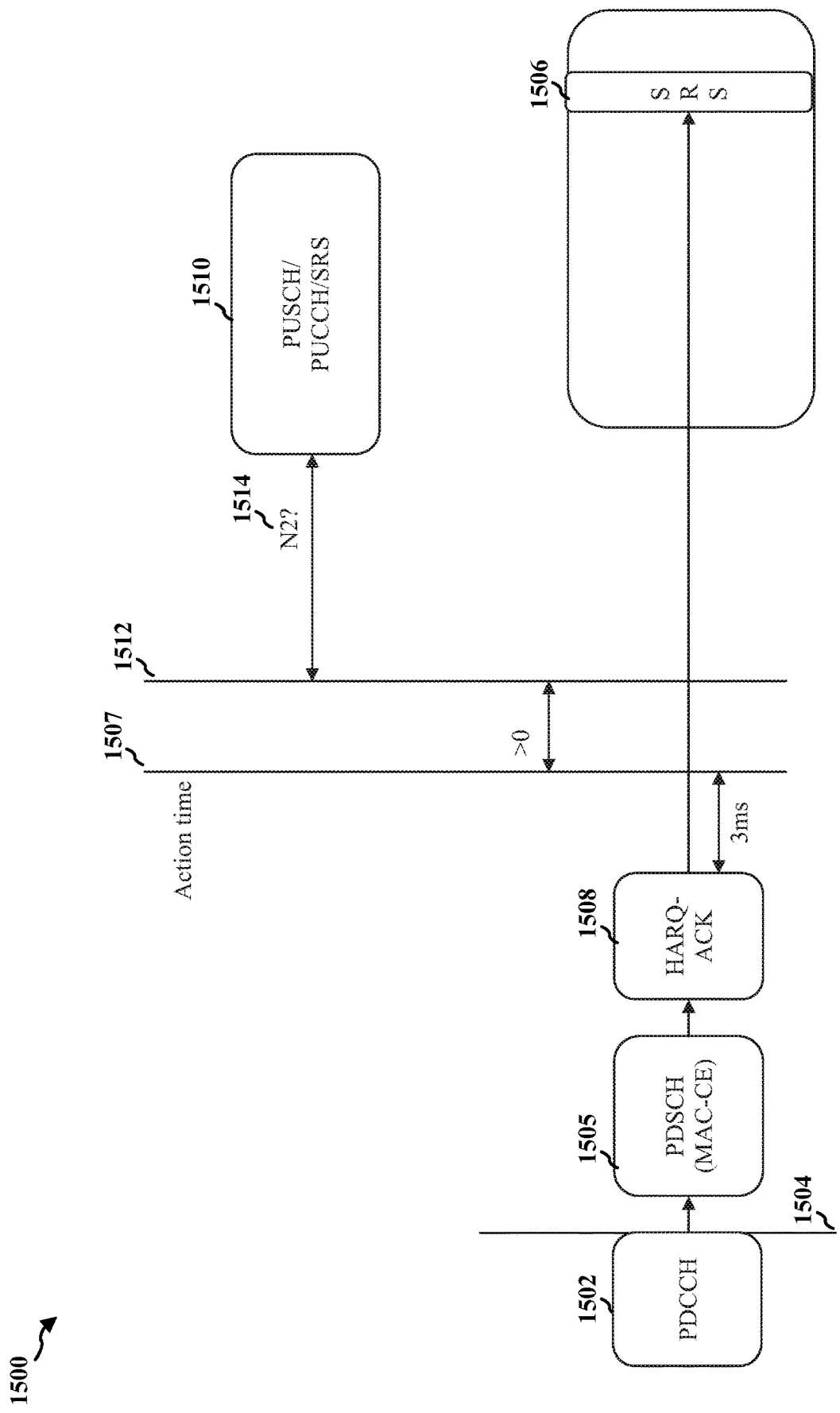
FIG. 15 is a diagram illustrating another example of a timeline for carrier-switched SRS transmission relative to an uplink transmission.

FIG. 15 illustrates a timeline 1500 for carrier-switched SRS transmission relative to another example of an uplink transmission, namely P-CSI (on PUCCH or PUSCH), a non-carrier-switched SRS, or a PUSCH not carrying UCI, when the carrier-switched SRS is semi-persistent. In this example, a UE receives a PDCCH 1502 from a base station at reception time 1504. The PDCCH 1502 may include a DCI that schedules a PDSCH 1505, which in turn may include a MAC-CE that activates a semi-persistently scheduled, carrier-switched SRS 1506 beginning at an action time 1507 and causes the UE to send HARQ-ACK 1508 in response to the PDSCH. The action time 1507 may occur a period of time subsequent to the HARQ-ACK 1508 (e.g. 3 ms after sending the HARQ-ACK). The UE also receives a PDCCH (not shown) that may include a DCI that schedules an uplink transmission 1510 such as a PUSCH or PUCCH, including P-CSI with only CQI or PMI, a non-carrier switched SRS, or a PUSCH not carrying UCI. The carrier-switched SRS 1506 is scheduled to be transmitted on a different carrier than the uplink transmission 1510. SRS decision time 1512 may be $N_2$ symbols 1514 (or some other timing) prior to the uplink transmission 1510.

In this example, the action time 1507 is prior to (more than zero symbols before) the SRS decision time 1512. Thus, prior to commencing SRS transmission, the UE may determine that a PDCCH (not shown) is scheduling an uplink transmission (the uplink transmission 1510) which overlaps with the carrier-switched SRS 1506. For example, the UE may determine that the uplink transmission illustrated in the example of FIG. 15 will be scheduled to occur during at least one symbol within a switching time for the carrier-switched SRS 1506. In such case, the conflict resolution rules indicate the UE to drop the uplink transmission (the P-CSI with only CQI/PMI, the non-carrier switched SRS, or the PUSCH not carrying UCI) in favor of carrier-switched SRS 1506. For example, the UE may determine that, for a carrier of a serving cell with slot formats comprised of DL and UL symbols, not configured for PUSCH/PUCCH transmission, the UE may drop PUCCH/PUSCH transmission carrying periodic CSI comprising only CQI/PMI, PUSCH not carrying UCI, and/or SRS transmission on another serving cell configured for PUSCH/PUCCH transmission whenever the transmission and SRS transmission (including any interruption due to uplink or downlink RF retuning time as defined by higher layer parameters switchingTimeUL and switchingTimeDL of srs-SwitchingTimeNR) on the serving cell happen to overlap in the same symbol and that can result in uplink transmissions beyond the UE's indicated uplink carrier aggregation capability. Thus, at SRS decision time 1512, the UE may determine to drop the uplink transmission 1510, thereby avoiding a conflict with the carrier-switched SRS.

Figure 16:
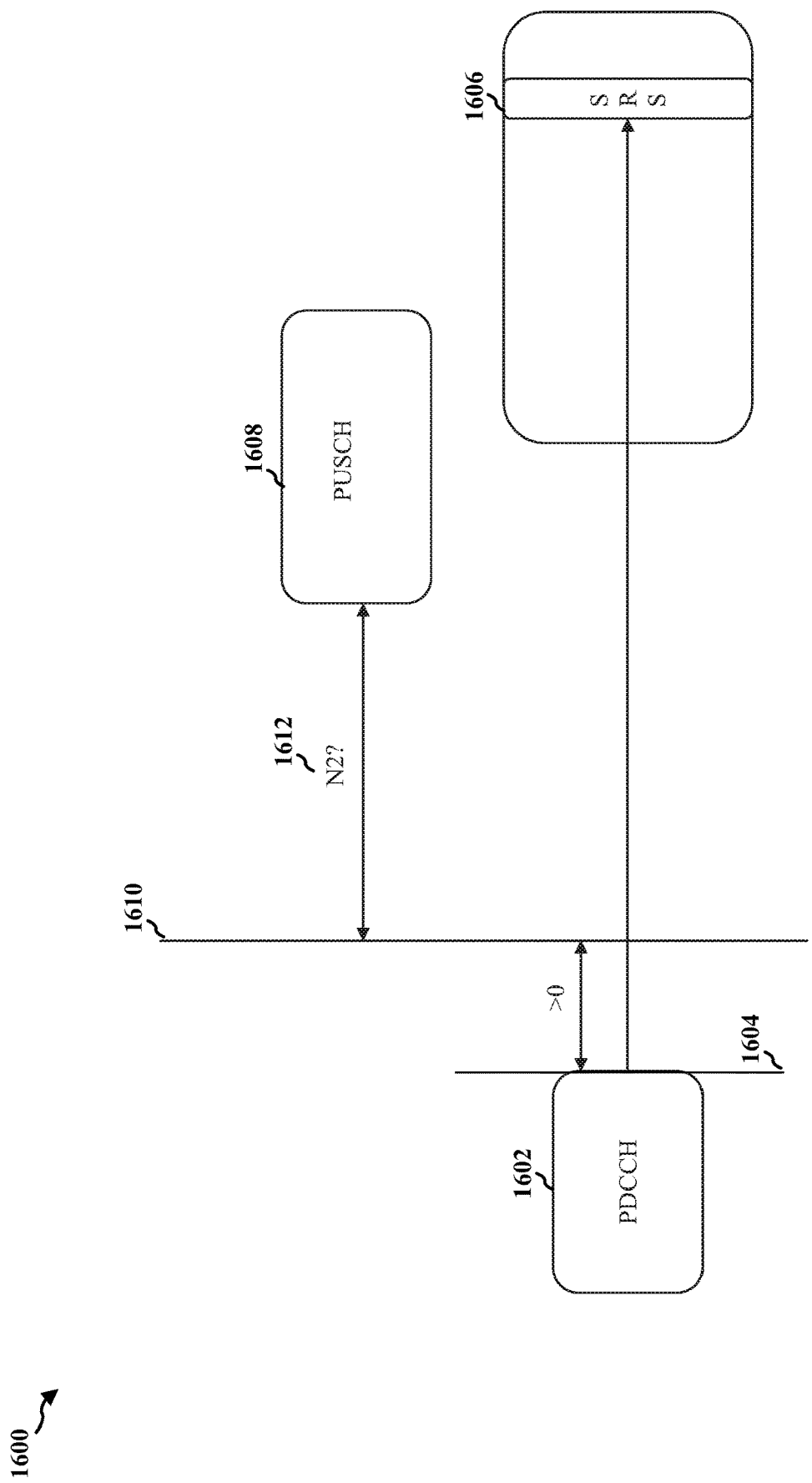
FIG. 16 is a diagram illustrating another example of a timeline for carrier-switched SRS transmission relative to an uplink transmission.

FIG. 16 illustrates a timeline 1600 for carrier-switched SRS transmission relative to another example of an uplink transmission, namely A-CSI (on PUSCH), when the carrier-switched SRS is aperiodic. In this example, a UE receives a PDCCH 1602 from a base station at reception time 1604. The PDCCH 1602 schedules or triggers a carrier-switched SRS 1606. The carrier-switched SRS may be aperiodic. The UE also receives a PDCCH (not shown) that may include a DCI that schedules an uplink transmission 1608 such as A-CSI with only CQI or PMI on a PUSCH. The carrier-switched SRS 1606 is scheduled to be transmitted on a different carrier than the uplink transmission 1608. SRS decision time 1610 may be $N_2$ symbols 1612 (or some other timing) prior to the uplink transmission 1608.

In this example, the reception time 1604 for the PDCCH 1602 scheduling the carrier-switched SRS 1606 is prior to (more than zero symbols before) the SRS decision time 1610. Thus, prior to commencing SRS transmission, the UE may determine that a PDCCH (not shown) is scheduling an uplink transmission (the uplink transmission 1608) which overlaps with the carrier-switched SRS 1606. For example, the UE may determine that the uplink transmission illustrated in the example of FIG. 16 will be scheduled to occur during at least one symbol within a switching time for the carrier-switched SRS 1606. In such case, the conflict resolution rules indicate the UE to drop the uplink transmission (the A-CSI with only CQI/PMI) in favor of carrier-switched SRS 1606. For example, the UE may determine that, for a carrier of a serving cell with slot formats comprised of DL and UL symbols, not configured for PUSCH/PUCCH transmission, the UE may drop PUSCH transmission carrying aperiodic CSI comprising only CQI/PMI whenever the transmission and aperiodic SRS transmission (including any interruption due to uplink or downlink RF retuning time as defined by higher layer parameters switchingTimeUL and switchingTimeDL of srs-SwitchingTimeNR) on the serving cell happen to overlap in the same symbol and that can result in uplink transmissions beyond the UE's indicated uplink carrier aggregation capability. Thus, at SRS decision time 1610, the UE may determine to drop the uplink transmission 1608, thereby avoiding a conflict with the carrier-switched SRS.

Figure 17:
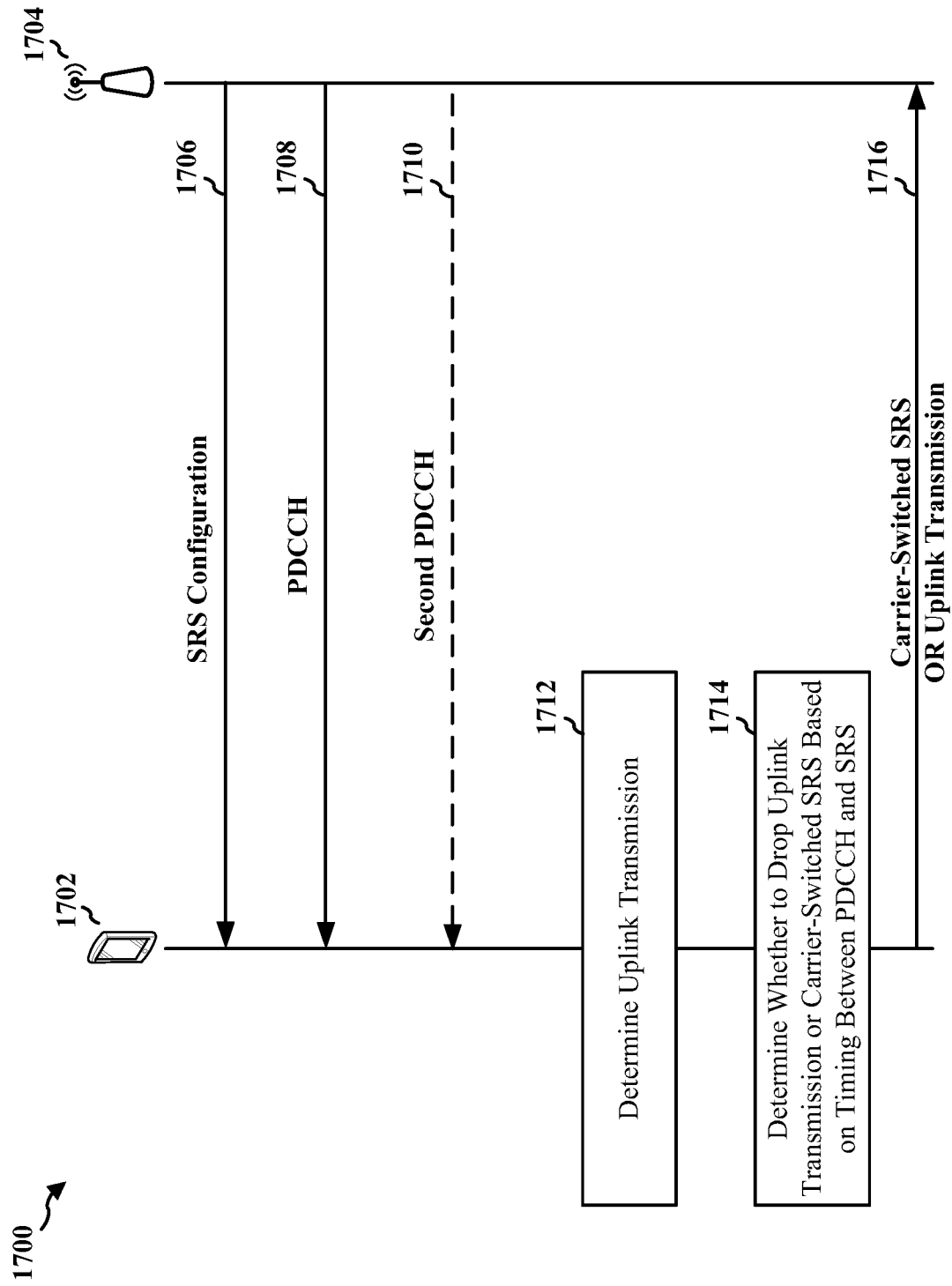
FIG. 17 is a diagram illustrating a call flow between a UE and a base station.

FIG. 17 is a diagram 1700 illustrating an example of a call flow between a UE 1702 and a base station 1704. The UE may receive an SRS configuration 1706 from the base station. The SRS configuration 1706 may configure the UE to transmit a carrier-switched SRS that may be periodic, semi-persistent, or aperiodic (in response to a trigger in a grant). The UE may transmit the carrier-switched SRS on a different uplink component carrier than a source carrier used to transmit uplink data (e.g. in response to a PDCCH). The UE may determine a scheduled time for transmitting the carrier-switched SRS from the SRS configuration.

The UE 1702 may subsequently receive a PDCCH 1708 from the base station 1704. The PDCCH 1708 may schedule or trigger an uplink transmission of the UE on the source carrier. For example, the PDCCH 1708 may schedule a HARQ-ACK on PUCCH in response to a PDSCH as described above with respect to FIG. 5, a semi-persistently scheduled HARQ-ACK on PUCCH as described above with respect to FIG. 6, or a HARQ-ACK in response to a SPS release in the PDCCH 1708 as described above with respect to FIG. 7. The UE 1702 may also receive a second PDCCH 1710 from the base station 1704 that schedules another uplink transmission of the UE, and the HARQ-ACK may be multiplexed with the other uplink transmission such as described above with respect to FIG. 8. In another example, the uplink transmission may be a SR that is indicated by higher layers of the UE. In a further example, the PDCCH 1708 may schedule uplink data on a PUSCH that is multiplexed with P-CSI including RI or CRI such as described above with respect to FIG. 9. In another example, the PDCCH 1708 may schedule activation of a semi-persistently scheduled CSI including RI or CRI such as described above with respect to FIG. 10, or the PDCCH 1708 may trigger A-CSI carrying RI or CRI such as described above with respect to FIG. 11. In an additional example, the PDCCH 1708 may include a PDCCH order that schedules a PRACH transmission such as described above with respect to FIG. 12. In a further example, the PDCCH 1708 may include a DCI triggering a PUSCH carrying A-CSI such as described above with respect to FIG. 13. In another example, the PDCCH 1708 may schedule uplink data on a PUCCH or PUSCH including P-CSI comprising only CQI or PMI, uplink data on a PUSCH that does not carry UCI, or a non-carrier switched SRS such as described above with respect to FIG. 14 or 15, or the PDCCH 1708 may trigger A-CSI comprising only CQI or PMI on PUSCH such as described above with respect to FIG. 16.

Next, at 1712, the UE 1702 determines the scheduled or triggered uplink transmission. For example, the UE may determine the uplink transmission to be a HARQ-ACK corresponding to a dynamic grant as described above with respect to FIG. 5, a semi-persistently scheduled HARQ-ACK as described above with respect to FIG. 6, a HARQ-ACK in response to a SPS release as described above with respect to FIG. 7, or a HARQ-ACK that is multiplexed with another uplink transmission such as described above with respect to FIG. 8. In another example, the UE may determine the uplink transmission to be a SR that is indicated by higher layers of the UE. In a further example, the UE may determine the uplink transmission to be P-CSI including RI or CRI that is multiplexed with uplink data on a PUSCH as described above with respect to FIG. 9. In another example, UE may determine the uplink transmission to be a semi-persistently scheduled CSI including RI or CRI as described above with respect to FIG. 10, or A-CSI carrying RI or CRI as described above with respect to FIG. 11. In an additional example, the UE may determine the uplink transmission to be a PRACH transmission as described above with respect to FIG. 12. In a further example, the UE may determine the uplink transmission to be A-CSI on PUSCH as described above with respect to FIG. 13. In another example, the UE may determine the uplink transmission to be P-CSI comprising only CQI or PMI on PUCCH or PUSCH, uplink data on a PUSCH that does not carry UCI, or a non-carrier switched SRS as described above with respect to FIG. 14 or 15, or A-CSI comprising only CQI or PMI on PUSCH as described above with respect to FIG. 16.

Then, at 1714, the UE 1702 determines whether to drop the uplink transmission or the carrier-switched SRS based on a timing between a reception of the PDCCH and a scheduled time for transmitting the carrier-switched SRS. The UE may also determine whether to drop the uplink transmission or the carrier-switched SRS based on another timing between the uplink transmission and the carrier-switched SRS. For instance, the UE may determine to drop one of the carrier-switched SRS or the uplink transmission based on the conflict resolution rules described above. The UE may then transmit (at 1716) either the carrier-switched SRS or the uplink transmission to the base station 1704 based on the determination at 1714.

For example, if the UE determines the uplink transmission to be a HARQ-ACK corresponding to a dynamic grant (see FIG. 5), a semi-persistently scheduled HARQ-ACK (see FIG. 6), or a HARQ-ACK in response to a SPS release (see FIG. 7), the UE may determine to drop the carrier-switched SRS in response to identifying both that: (1) the PDCCH 1708 scheduling the HARQ-ACK on PUCCH in response to the PDCCH or PDSCH is received at least $N_2$+switchingTime symbols prior to the scheduled time for transmitting the SRS and (2) the HARQ-ACK overlaps with either the scheduled time for transmitting the SRS or a carrier switching time associated with the SRS, as described above with respect to FIGS. 5-7.

In another example, if the UE determines the uplink transmission to be a HARQ-ACK that is multiplexed with another uplink transmission scheduled by the second PDCCH 1710 (see FIG. 8), the UE may determine to drop the carrier-switched SRS in response to identifying both that: (1) the PDCCH 1708 scheduling the HARQ-ACK on PUCCH in response to the PDSCH, and the second PDCCH 1710 scheduling the PUSCH multiplexed with the HARQ-ACK, are received at least $N_2$+switchingTime symbols prior to the scheduled time for transmitting the SRS and (2) the multiplexed HARQ-ACK overlaps with either the scheduled time for transmitting the SRS or a carrier switching time associated with the SRS, as described above with respect to FIG. 8.

In another example, if the UE determines the uplink transmission to be a SR indicated by higher layers of the UE, the UE may determine to drop the carrier-switched SRS in response to identifying that the SR overlaps with either the scheduled time for transmitting the SRS or a carrier switching time associated with the SRS.

In a further example, if the UE determines the uplink transmission to be P-CSI including RI or CRI that is multiplexed with uplink data on a PUSCH (see FIG. 9), the UE may determine to drop the carrier-switched SRS in response to identifying both that: (1) the PDCCH 1708 scheduling the uplink data on a PUSCH that is multiplexed with the P-CSI is received at least $N_2$+switchingTime symbols prior to the scheduled time for transmitting the SRS and (2) the P-CSI overlaps with either the scheduled time for transmitting the SRS or a carrier switching time associated with the SRS, as described above with respect to FIG. 9.

In another example, if the UE determines the uplink transmission to be a semi-persistently scheduled CSI including RI or CRI (see FIG. 10), the UE may determine to drop the carrier-switched SRS in response to identifying that: (1) the PDCCH 1708 schedules activation of the SP-CSI beginning at an action time at least $N_2$+switchingTime symbols prior to the scheduled time for transmitting the SRS and (2) the semi-persistently scheduled CSI overlaps with either the scheduled time for transmitting the SRS or a carrier switching time associated with the SRS, as described above with respect to FIG. 10. The action time may be based on the time for transmission of a HARQ-ACK associated with the channel carrying the activation command for the SP-CSI (e.g. 3 ms after the HARQ-ACK).

In an additional example, if the UE determines the uplink transmission to be A-CSI carrying RI or CRI (see FIG. 11), the UE may determine to drop the carrier-switched SRS in response to identifying both that: (1) the PDCCH 1708 scheduling or triggering the A-CSI is received at least $N_2$+switchingTime symbols prior to the scheduled time for transmitting the SRS and (2) the A-CSI overlaps with either the scheduled time for transmitting the SRS or a carrier switching time associated with the SRS, as described above with respect to FIG. 11.

In an additional example, if the UE determines the uplink transmission to be a PRACH transmission (see FIG. 12), the UE may determine to drop the carrier-switched SRS in response to identifying both that: (1) the PDCCH 1708 including the PDCCH order scheduling the PRACH transmission is received at least $N_2$+switchingTime symbols prior to the scheduled time for transmitting the SRS and (2) the PRACH overlaps with either the scheduled time for transmitting the SRS or a carrier switching time associated with the SRS, as described above with respect to FIG. 12.

In a further example, if the UE determines the uplink transmission to be A-CSI on PUSCH (see FIG. 13), the UE may determine to drop the carrier-switched SRS in response to identifying both that: (1) the PDCCH 1708 scheduling or triggering the PUSCH carrying A-CSI is received at least $N_2$+switchingTime symbols prior to the scheduled time for transmitting the SRS and (2) the A-CSI overlaps with either the scheduled time for transmitting the SRS or a carrier switching time associated with the SRS, as described above with respect to FIG. 13.

In another example, if the UE determines the uplink transmission to be P-CSI comprising only CQI or PMI on PUCCH or PUSCH, uplink data on a PUSCH that does not carry UCI, or a non-carrier switched SRS, and if the carrier-switched SRS is aperiodic (see FIG. 14), the UE may determine to drop the uplink transmission in response to identifying both that: (1) the PDCCH 1708 scheduling or triggering the carrier-switched SRS is received at least $N_2$ symbols prior to the scheduled time for transmitting the uplink transmission, and (2) the uplink transmission overlaps with either the scheduled time for transmitting the SRS or a carrier switching time associated with the SRS, as described above with respect to FIG. 14.

In a further example, if the UE determines the uplink transmission to be P-CSI comprising only CQI or PMI on PUCCH or PUSCH, uplink data on a PUSCH that does not carry UCI, or a non-carrier switched SRS, and if the carrier-switched SRS is semi-persistently scheduled (see FIG. 15), the UE may determine to drop the uplink transmission in response to identifying both that: (1) the PDCCH 1708 schedules activation of the semi-persistent carrier-switched SRS beginning at an action time at least at least $N_2$ symbols prior to the scheduled time for transmitting the uplink transmission, and (2) the uplink transmission overlaps with either the scheduled time for transmitting the SRS or a carrier switching time associated with the SRS, as described above with respect to FIG. 15. The action time may be based on the time for transmission of a HARQ-ACK associated with the channel carrying the activation command for the semi-persistent carrier-switched SRS (e.g. 3 ms after the HARQ-ACK).

In an additional example, if the UE determines the uplink transmission to be A-CSI comprising only CQI or PMI on PUSCH, and if the carrier-switched SRS is aperiodic (see FIG. 16), the UE may determine to drop the uplink transmission in response to identifying both that: (1) the PDCCH 1708 scheduling or triggering the carrier-switched SRS is received at least $N_2$ symbols prior to the scheduled time for transmitting the A-CSI, and (2) the PUSCH transmission carrying the A-CSI overlaps with either the scheduled time for transmitting the SRS or a carrier switching time associated with the SRS, as described above with respect to FIG. 16.

Figure 18:
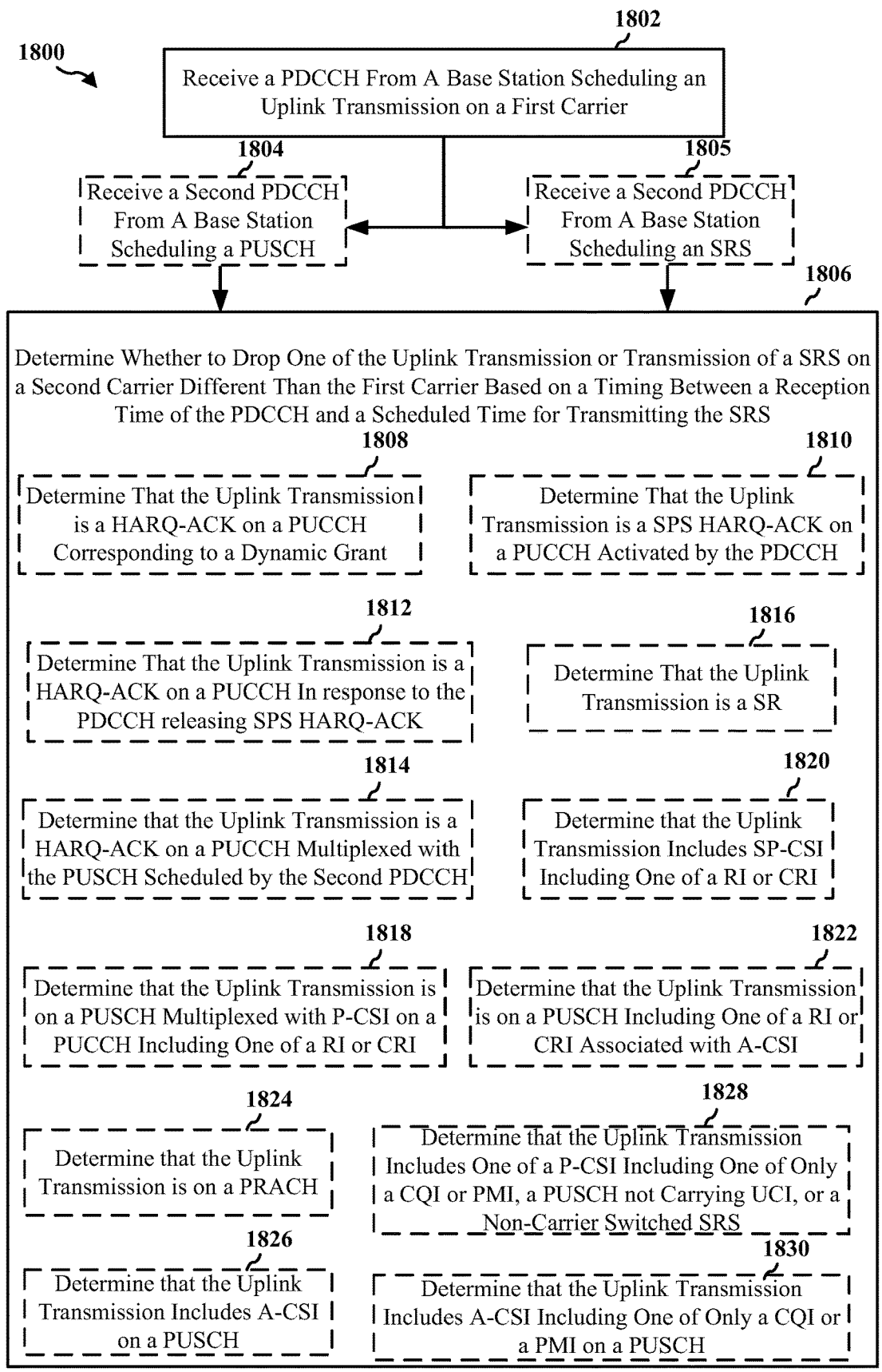
FIG. 18 is a flowchart of a method of wireless communication.

FIG. 18 is a flowchart 1800 of a method of wireless communication. The method may be performed by a UE (e.g. the UE 104, 350, 1702; the apparatus 1902). Optional aspects are illustrated in dashed lines. The method allows a UE to effectively resolve conflicts between different types of uplink transmissions and carrier-switched SRS based on a timing between the reception of the PDCCH scheduling the uplink transmission and a scheduled time for transmitting the carrier-switched SRS.

At 1802, the UE receives a PDCCH from a base station, the PDCCH scheduling an uplink transmission on a first carrier. For example, 1802 may be performed by PDCCH component 1940 of FIG. 19. For instance, referring to FIG. 17, the UE 1702 may receive a DCI in PDCCH 1708 from a base station 1704 that schedules an uplink transmission (one of the various uplink transmissions described above with respect to FIGS. 5-16) on an uplink component carrier (e.g. a source carrier).

At 1804, the UE may receive a second PDCCH from the base station, where the second PDCCH schedules a PUSCH. For example, 1804 may be performed by PDCCH component 1940 of FIG. 19. For instance, referring to FIG. 17, the UE 1702 may receive a DCI in second PDCCH 1710 from the base station 1704 that schedules uplink data on PUSCH.

At 1805, the UE may receive a second PDCCH from the base station, the second PDCCH scheduling a SRS on the second carrier. For example, 1805 may be performed by PDCCH component 1940 of FIG. 19. For instance, referring to FIGS. 14-17, the UE 1702 may receive a DCI in PDCCH 1402, 1502, or 1602 from the base station 1704 that schedules carrier-switched SRS 1406, 1506, or 1606, respectively.

At 1806, the UE determines whether to drop one of the uplink transmission or transmission of the SRS on a second carrier different than the first carrier based on a timing between a reception time of the PDCCH and a scheduled time for transmitting the SRS. For example, 1806 may performed by decision component 1944 of FIG. 19. For instance, referring to FIG. 17, at 1714, the UE 1702 may determine whether to drop either an uplink transmission such as any of those described above with respect to FIGS. 5-16 or a carrier-switched SRS in response to identifying that a reception time of the DCI in the PDCCH 1708 scheduling or triggering the uplink transmission (e.g., a last symbol of the PDCCH) occurs at least a certain amount of time (e.g. $N_2$+switchingTime symbols) prior to a scheduled time for transmitting the carrier-switched SRS (e.g. as configured in SRS configuration 1706 or another PDCCH). The carrier-switched SRS may be configured for transmission on a different uplink component carrier than the source carrier for the uplink transmission. The UE may also determine whether to drop one of the uplink transmission or the carrier-switched SRS based on a timing between the uplink transmission and the SRS. For instance, the UE may determine to drop either the uplink transmission or the carrier-switched SRS in response to the uplink transmission overlapping with the carrier-switched SRS (including its switching time).

The timing may be based on a first numerology of a first cell carrying a grant scheduling the SRS and a second numerology of a second cell including the second carrier. The timing may also include a switching time for switching from the first carrier to the second carrier to transmit the SRS. The timing may also be based on a numerology, where the numerology is a numerology with a smallest subcarrier spacing (SCS) of the numerology of one or more cells including at least the cell where the PDCCH is received, the cell where the cross-carrier SRS is scheduled, and the cell where the uplink transmission is transmitted. For example, the value of $N_2$ above may be calculated based on the worst case carrier between the involved carriers for carrier-switched SRS. Thus, the timing may be based on a subcarrier spacing (e.g., numerology) for the first carrier or the second carrier, and the subcarrier spacing may comprise a smaller SCS between the first carrier and the second carrier. Both the source component carrier and the target component carrier may be cross-carrier scheduled. For example, the value of $N_2$ may be calculated based on $\mu$ of Tables 1 and 2 for UE processing capability 1 and 2 respectively, where $\mu$ corresponds to one of a subcarrier spacing of the downlink with which the PDCCH was transmitted or a subcarrier spacing of the uplink with which the PUSCH is to be transmitted that results in the largest UE PUSCH preparation procedure time (Tproc,2). For instance, a value of $\mu$ in either table corresponding to a numerology with the smallest subcarrier spacing out of the various numerologies (e.g. $\mu$=0) may be the worst-case carrier that results in the largest PUSCH preparation procedure time.

The decision at 1806 whether to drop the carrier-switched SRS or the uplink transmission may depend on the uplink transmission. The UE may determine the uplink transmission to be one of the various uplink transmissions described above with respect to FIGS. 5-16, and drop either the carrier-switched SRS or the uplink transmission depending on the conflict resolution rules described above.

Moreover, the decision at 1806 whether to drop the carrier-switched SRS or the uplink transmission may be based on a timing between a reception time of the second PDCCH received at 1805 and a scheduled time for the uplink transmission. For instance, referring to FIG. 17, at 1714, the UE 1702 may determine whether to drop the uplink transmission such as any of those described above with respect to FIGS. 14-16 or the carrier-switched SRS, in response to identifying that a reception time of the DCI in the second PDCCH (e.g., PDCCH 1402, 1502, or 1602) scheduling or triggering the carrier-switched SRS (e.g., a last symbol of the second PDCCH) occurs at least a certain amount of time (e.g. $N_2$ symbols) prior to a scheduled time for transmitting the uplink transmission (e.g., uplink transmission 1408, 1510, or 1608).

In one example, at 1808, the UE may determine that the uplink transmission is a HARQ-ACK on a PUCCH, where the HARQ-ACK corresponds to a dynamic grant, e.g. as described with respect to FIG. 5. For example, 1808 may performed by determination component 1942 of FIG. 19. In such case, the SRS may be dropped in response to the HARQ-ACK overlapping with one of the scheduled time for transmitting the SRS or a carrier switching time associated with the SRS.

In another example, at 1810, the UE may determine that the uplink transmission is a SPS HARQ-ACK on a PUCCH, where the PDCCH activates the SPS HARQ-ACK, e.g. as described with respect to FIG. 6. For example, 1810 may performed by determination component 1942 of FIG. 19. In such case, the SRS may be dropped in response to the SPS HARQ-ACK overlapping with one of the scheduled time for transmitting the SRS or a carrier switching time associated with the SRS.

In another example, at 1812, the UE may determine that the uplink transmission is a HARQ-ACK on a PUCCH, where the PDCCH releases SPS HARQ-ACK, e.g. as described with respect to FIG. 7. For example, 1812 may performed by determination component 1942 of FIG. 19. In such case, the SRS may be dropped in response to the HARQ-ACK overlapping with one of the scheduled time for transmitting the SRS or a carrier switching time associated with the SRS.

In another example, at 1814, the UE may determine that the uplink transmission is a HARQ-ACK on a PUCCH, where the HARQ-ACK is multiplexed with the PUSCH scheduled by the second PDCCH at 1804, and the UE may determine whether to drop the one of the uplink transmission or the transmission of the SRS further based on a reception time of the second PDCCH, e.g. as described with respect to FIG. 8. For example, 1814 may performed by determination component 1942 of FIG. 19. In such case, the SRS may be dropped in response to the PUSCH overlapping with one of the scheduled time for transmitting the SRS or a carrier switching time associated with the SRS.

In another example, at 1816, the UE may determine that the uplink transmission is a SR. For example, 1816 may performed by determination component 1942 of FIG. 19. In such case, the SRS may be dropped in response to the SR overlapping with one of the scheduled time for transmitting the SRS or a carrier switching time associated with the SRS.

In another example, at 1818, the UE may determine that the uplink transmission is on a PUSCH that is multiplexed with a P-CSI on a PUCCH including one of a RI or a CRI, e.g. as described with respect to FIG. 9. For example, 1818 may performed by determination component 1942 of FIG. 19. In such case, the SRS may be dropped in response to the PUSCH overlapping with one of the scheduled time for transmitting the SRS or a carrier switching time associated with the SRS.

In another example, at 1820, the UE may determine that the uplink transmission includes a SP-CSI including one of a RI or a CRI, and the UE may determine whether to drop the one of the uplink transmission or the SRS further based on the timing between an action time associated with the SP-CSI and the scheduled time for transmitting the SRS, e.g.

as described with respect to FIG. 10. For example, 1820 may performed by determination component 1942 of FIG. 19. In such case, the SRS may be dropped in response to the SP-CSI overlapping with one of the scheduled time for transmitting the SRS or a carrier switching time associated with the SRS. The action time may be based at least on a time for transmission of a HARQ-ACK associated with a channel carrying an activation command for the SP-CSI.

In another example, at 1822, the UE may determine that the uplink transmission is on a PUSCH including one of a RI or a CRI associated with A-CSI, e.g. as described with respect to FIG. 11. For example, 1822 may performed by determination component 1942 of FIG. 19. In such case, the SRS may be dropped in response to the PUSCH overlapping with one of the scheduled time for transmitting the SRS or a carrier switching time associated with the SRS.

In another example, at 1824, the UE may determine that the uplink transmission is on a PRACH, e.g. as described with respect to FIG. 12. For example, 1824 may performed by determination component 1942 of FIG. 19. In such case, the SRS may be dropped in response to the PRACH overlapping with one of the scheduled time for transmitting the SRS or a carrier switching time associated with the SRS.

In another example, at 1826, the UE may determine that the uplink transmission includes A-CSI on a PUSCH, e.g. as described with respect to FIG. 13. For example, 1826 may performed by determination component 1942 of FIG. 19. In such case, the SRS may be dropped in response to the PUSCH overlapping with one of the scheduled time for transmitting the SRS or a carrier switching time associated with the SRS and the SRS is one of periodic SRS (P-SRS) or semi-persistently scheduled SRS (SPS SRS).

In another example, at 1828, the UE may determine that the uplink transmission includes one of: a P-CSI including one of only a CQI or only a PMI on one of a PUCCH or a PUSCH, a PUSCH that does not carry UCI, or a non-carrier switched SRS, e.g. as described with respect to FIG. 14. For example, 1828 may performed by determination component 1942 of FIG. 19. In such case, the uplink transmission may be dropped in response to the uplink transmission overlapping with one of the scheduled time for transmitting the SRS or a carrier switching time associated with the SRS and the SRS is aperiodic SRS (A-SRS). In another example, also at 1828, the UE may determine that the uplink transmission includes one of: a P-CSI including one of only a CQI or only a PMI on one of a PUCCH or a PUSCH, a PUSCH that does not carry UCI, or a non-carrier switched SRS, and the UE may determine whether to drop the one of the uplink transmission or the transmission of the SRS further based on the timing between an action time associated with the SRS and a time for transmitting the uplink transmission, where the SRS is SP-SRS, e.g. as described with respect to FIG. 15. In such case, the uplink transmission may be dropped in response to the uplink transmission overlapping with one of the scheduled time for transmitting the SRS or a carrier switching time associated with the SRS. The action time may be based at least on a time for transmission of a HARQ-ACK associated with a channel carrying an activation command for the SP-SRS.

Finally, at 1830, the UE may determine that the uplink transmission includes A-CSI including one of only a CQI or only a PMI on a PUSCH, e.g. as described with respect to FIG. 16. For example, 1830 may performed by determination component 1942 of FIG. 19. In such case, the uplink transmission may be dropped in response to the uplink transmission overlapping with one of the scheduled time for transmitting the SRS or a carrier switching time associated with the SRS and the SRS is A-SRS.

Figure 19:
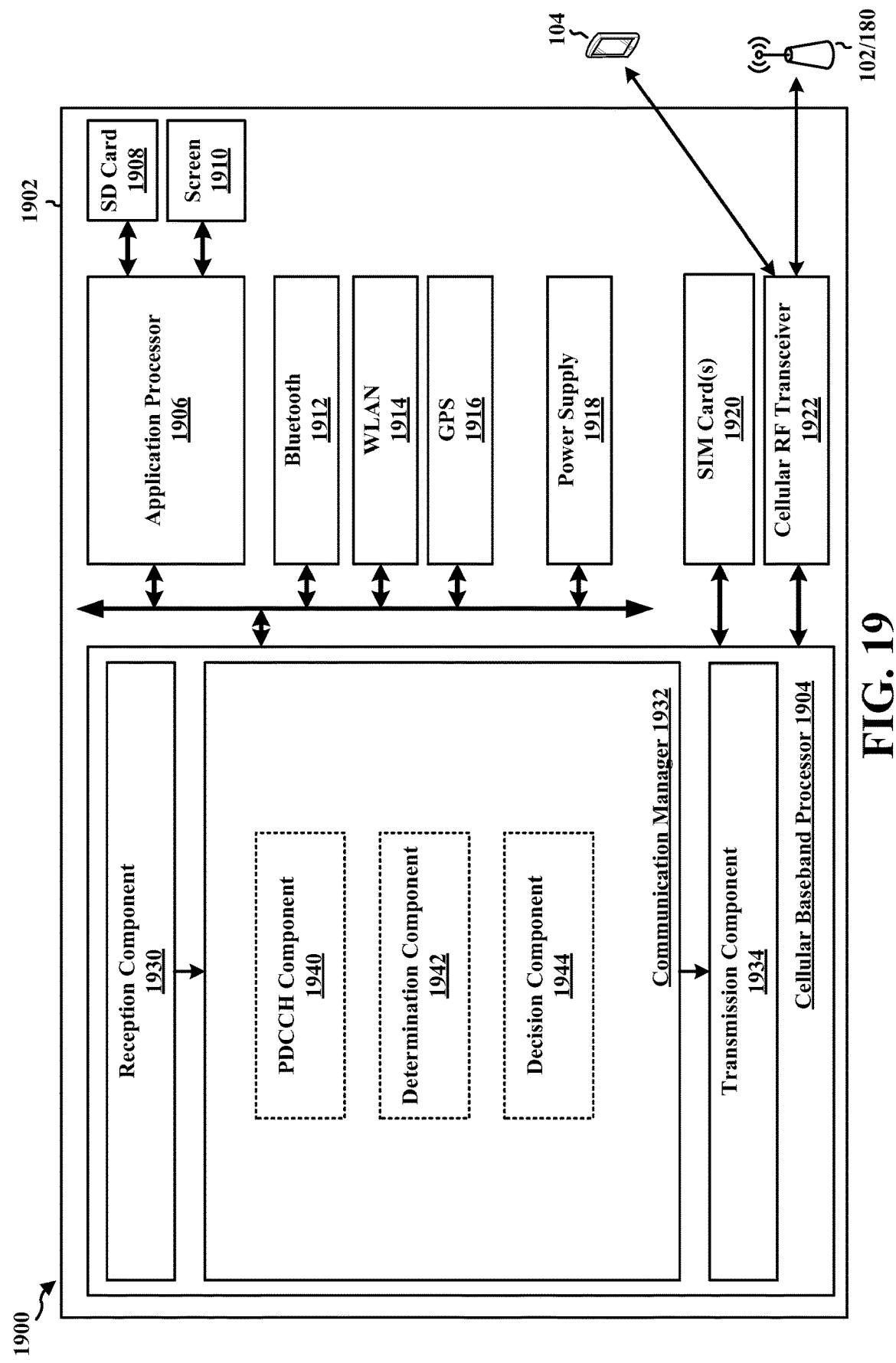
FIG. 19 is a diagram illustrating an example of a hardware implementation for an example apparatus.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902.

The communication manager 1932 includes a PDCCH component 1940 that is configured to receive a PDCCH from a base station that schedules an uplink transmission on a first carrier, e.g., as described in connection with 1802. The PDCCH component 1940 may also be configured to receive a second PDCCH from the base station that schedules a PUSCH, e.g. as described in connection with 1804. The PDCCH component 1940 may further be configured to receive a second PDCCH from the base station that schedules the SRS on the second carrier, e.g., as described in connection with 1805. The communication manager 1932 further includes a determination component 1942 that receives input in the form of downlink data in the PDCCH(s) from the PDCCH component 1940 and is configured to determine the uplink transmission scheduled by the PDCCH(s).

In one example, the determination component 1942 may be configured to determine that the uplink transmission is a HARQ-ACK on a PUCCH, where the HARQ-ACK corresponds to a dynamic grant, e.g. as described in connection with 1808. In another example, the determination component 1942 may be configured to determine that the uplink transmission is a SPS HARQ-ACK on a PUCCH, where the PDCCH activates the SPS HARQ-ACK, e.g. as described in connection with 1810. In another example, the determination component 1942 may be configured to determine that the uplink transmission is a HARQ-ACK on a PUCCH, where the PDCCH releases SPS HARQ-ACK, e.g. as described in connection with 1812. In another example, the determination component 1942 may be configured to determine that the uplink transmission is a HARQ-ACK on a PUCCH, where the HARQ-ACK is multiplexed with the PUSCH scheduled by the second PDCCH, e.g. as described in connection with 1814. In another example, the determination component 1942 may be configured to determine that the uplink transmission is a SR, e.g. as described in connection with 1816.

In another example, the determination component 1942 may be configured to determine that the uplink transmission is on a PUSCH that is multiplexed with a P-CSI on a PUCCH including one of a RI or a CRI, e.g. as described in connection with 1818. In another example, the determination component 1942 may be configured to determine that the uplink transmission includes a SP-CSI including one of a RI or a CRI, e.g. as described in connection with 1820. In another example, the determination component 1942 may be configured to determine that the uplink transmission is on a PUSCH including one of a RI or a CRI associated with A-CSI, e.g. as described in connection with 1822. In another example, the determination component 1942 may be configured to determine that the uplink transmission is on a PRACH, e.g. as described in connection with 1824. In another example, the determination component 1942 may be configured to determine that the uplink transmission includes A-CSI on a PUSCH, e.g. as described in connection with 1826.

In another example, the determination component 1942 may be configured to determine that the uplink transmission includes one of: a P-CSI including one of only a CQI or only a PMI on one of a PUCCH or a PUSCH, a PUSCH that does not carry UCI, or a non-carrier switched SRS, e.g. as described in connection with 1828. In another example, the determination component 1942 may be configured to determine that the uplink transmission includes A-CSI including one of only a CQI or only a PMI on a PUSCH, e.g. as described in connection with 1830.

The communication manager 1932 further includes a decision component 1944 that receives input from the PDCCH component 1940 in the form of a reception time of the PDCCH and input from the determination component 1942 including information regarding the scheduled uplink transmission(s), and the decision component 1944 is configured to determine whether to drop one of the uplink transmission or transmission of a SRS on a second carrier different than the first carrier based on a timing between a reception time of the PDCCH and a scheduled time for transmitting the SRS, e.g. as described in connection with 1806. The decision component 1944 may also be configured to determine whether to drop the one of the uplink transmission or the SRS further based on a reception time of the second PDCCH scheduling the PUSCH, e.g. as described in connection with 1814. The decision component 1944 may further be configured to determine whether to drop the one of the uplink transmission or the SRS based on a timing between a reception time of the second PDCCH scheduling the SRS and a scheduled time for the uplink transmission, e.g., as described in connection with 1806, 1828, and 1830. The decision component 1944 may also be configured to determine whether to drop the one of the uplink transmission or the SRS further based on the timing between an action time associated with the uplink transmission and the scheduled time for transmitting the SRS, e.g. as described in connection with 1820. The decision component 1944 may also be configured to determine whether to drop the one of the uplink transmission or the SRS further based on the timing between an action time associated with the SRS and a time for transmitting the uplink transmission, e.g. as described in connection with 1828. The decision component 1944 may further be configured to decide to drop the SRS in response to the uplink transmission overlapping with one of the scheduled time for transmitting the SRS or a carrier switching time associated with the SRS, e.g. as described in connection with 1808, 1810, 1812, 1814, 1816, 1818, 1820, 1822, 1824, and 1826. The decision component 1944 may additionally be configured to decide to drop the uplink transmission in response to the uplink transmission overlapping with one of the scheduled time for transmitting the SRS or a carrier switching time associated with the SRS, e.g. as described in connection with 1828 and 1830.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving a PDCCH from a base station, the PDCCH scheduling an uplink transmission on a first carrier, and means for determining whether to drop one of the uplink transmission or transmission of a SRS on a second carrier different than the first carrier based on a timing between a reception time of the PDCCH and a scheduled time for transmitting the SRS.

In one configuration, the timing may be based on subcarrier spacing for the first carrier or the second carrier. In one configuration, the subcarrier spacing may comprise a smaller subcarrier spacing between the first carrier and the second carrier.

In one configuration, the means for receiving may be configured to receive a second PDCCH from the base station, the second PDCCH scheduling the SRS on the second carrier. The means for determining may be configured to determine whether to drop the one of the uplink transmission or the transmission of the SRS based on a timing between a reception time of the second PDCCH and a scheduled time for the uplink transmission.

In one configuration, the timing may include a switching time for switching from the first carrier to the second carrier to transmit the SRS.

In one configuration, the apparatus 1902, and in particular the cellular baseband processor 1904, may include means for determining that the uplink transmission is a HARQ-ACK on a PUCCH, wherein the HARQ-ACK corresponds to a dynamic grant; and wherein the SRS is dropped in response to the HARQ-ACK overlapping with one of the scheduled time for transmitting the SRS or a carrier switching time associated with the SRS.

In one configuration, the apparatus 1902, and in particular the cellular baseband processor 1904, may include means for determining that the uplink transmission is a SPS HARQ-ACK on a PUCCH, wherein the PDCCH activates the SPS HARQ-ACK; and wherein the SRS is dropped in response to the SPS HARQ-ACK overlapping with one of the scheduled time for transmitting the SRS or a carrier switching time associated with the SRS.

In one configuration, the apparatus 1902, and in particular the cellular baseband processor 1904, may include means for determining that the uplink transmission is a HARQ-ACK on a PUCCH, wherein the PDCCH releases SPS HARQ-ACK; wherein the SRS is dropped in response to the HARQ-ACK overlapping with one of the scheduled time for transmitting the SRS or a carrier switching time associated with the SRS.

In one configuration, the apparatus 1902, and in particular the cellular baseband processor 1904, may include means for receiving a second PDCCH from the base station, the second PDCCH scheduling a PUSCH; and means for determining that the uplink transmission is a HARQ-ACK on a PUCCH, wherein the HARQ-ACK is multiplexed with the PUSCH; wherein the determining whether to drop the one of the uplink transmission or the transmission of the SRS is further based on a reception time of the second PDCCH; and wherein the SRS is dropped in response to the PUSCH overlapping with one of the scheduled time for transmitting the SRS or a carrier switching time associated with the SRS.

In one configuration, the apparatus 1902, and in particular the cellular baseband processor 1904, may include means for determining that the uplink transmission is a SR; and wherein the SRS is dropped in response to the SR overlapping with one of the scheduled time for transmitting the SRS or a carrier switching time associated with the SRS.

In one configuration, the apparatus 1902, and in particular the cellular baseband processor 1904, may include means for determining that the uplink transmission is on a PUSCH that is multiplexed with a P-CSI on a PUCCH including one of a RI or a CRI; wherein the SRS is dropped in response to the PUSCH overlapping with one of the scheduled time for transmitting the SRS or a carrier switching time associated with the SRS.

In one configuration, the apparatus 1902, and in particular the cellular baseband processor 1904, may include means for determining that the uplink transmission includes a SP-CSI including one of a RI or a CRI; wherein the determining whether to drop the one of the uplink transmission or the transmission of the SRS is further based on the timing between an action time associated with the SP-CSI and the scheduled time for transmitting the SRS; wherein the SRS is dropped in response to the SP-CSI overlapping with one of the scheduled time for transmitting the SRS or a carrier switching time associated with the SRS. The action time may be based at least on a time for transmission of a HARQ-ACK associated with a channel carrying an activation command for the SP-CSI.

In one configuration, the apparatus 1902, and in particular the cellular baseband processor 1904, may include means for determining that the uplink transmission is on a PUSCH including one of a RI or a CRI associated with A-CSI; wherein the SRS is dropped in response to the PUSCH overlapping with one of the scheduled time for transmitting the SRS or a carrier switching time associated with the SRS.

In one configuration, the apparatus 1902, and in particular the cellular baseband processor 1904, may include means for determining that the uplink transmission is on a PRACH; wherein the SRS is dropped in response to the PRACH overlapping with one of the scheduled time for transmitting the SRS or a carrier switching time associated with the SRS.

In one configuration, the apparatus 1902, and in particular the cellular baseband processor 1904, may include means for determining that the uplink transmission includes A-CSI on a PUSCH; wherein the SRS is dropped in response to the PUSCH overlapping with one of the scheduled time for transmitting the SRS or a carrier switching time associated with the SRS and the SRS is one of P-SRS or SPS SRS.

In one configuration, the apparatus 1902, and in particular the cellular baseband processor 1904, may include means for determining that the uplink transmission includes one of: a P-CSI including one of only a CQI or only a PMI on one of a PUCCH or a PUSCH; or a non-carrier switched SRS; wherein the uplink transmission is dropped in response to the uplink transmission overlapping with one of the scheduled time for transmitting the SRS or a carrier switching time associated with the SRS and the SRS is A-SRS.

In one configuration, the apparatus 1902, and in particular the cellular baseband processor 1904, may include means for determining that the uplink transmission includes one of: a P-CSI including one of only a CQI or only a PMI on one of a PUCCH or a PUSCH; or a non-carrier switched SRS; wherein the determining whether to drop the one of the uplink transmission or the transmission of the SRS is further based on the timing between an action time associated with the SRS and a time for transmitting the uplink transmission, wherein the SRS is SP-SRS; wherein the uplink transmission is dropped in response to the uplink transmission overlapping with one of the scheduled time for transmitting the SRS or a carrier switching time associated with the SRS. The action time may be based at least on a time for transmission of a HARQ-ACK associated with a channel carrying an activation command for the SP-SRS.

In one configuration, the apparatus 1902, and in particular the cellular baseband processor 1904, may include means for determining that the uplink transmission includes A-CSI including one of only a CQI or only a PMI on a PUSCH; wherein the uplink transmission is dropped in response to the uplink transmission overlapping with one of the scheduled time for transmitting the SRS or a carrier switching time associated with the SRS and the SRS is A-SRS.

In one configuration, the apparatus 1902, and in particular the cellular baseband processor 1904, may include means for determining that the uplink transmission includes a PUSCH that does not carry UCI; wherein the uplink transmission is dropped in response to the uplink transmission overlapping with one of the scheduled time for transmitting the SRS or a carrier switching time associated with the SRS.

In one configuration, the timing may be based on a numerology. The numerology may be a numerology with a smallest SCS of the numerology of one or more cells. The one or more cells may include at least a cell where the PDCCH is received, a cell where the SRS is scheduled on the second carrier, or the cell where the uplink transmission is transmitted on the first carrier.

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Hence, aspects of the present disclosure improve the effectiveness of conflict resolution between a scheduled uplink transmission from PDCCH and a carrier-switched SRS. If a decision time for transmitting a carrier-switched SRS occurs prior to a reception time for PDCCH, the UE may not be aware at the time it commences the carrier-switched SRS that an uplink transmission will even be scheduled. Such situations may cause a conflict between the SRS and the uplink transmission to occur. To prevent these situations, the UE may determine whether to drop the SRS or the uplink transmission based on a timing between the reception time for the PDCCH and the SRS decision time. For example, if the UE receives a PDCCH no later than $N_2$+switchingTime symbols prior to the first symbol of the carrier-switched SRS, the UE may determine the uplink transmission scheduled by the PDCCH and apply one of the aforementioned conflict resolution rules accordingly. By factoring the timing into the application of the conflict resolution rules, the aforementioned situations where conflicts may arise may be eliminated.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a physical downlink control channel (PDCCH) from a base station, the PDCCH scheduling an uplink transmission on a first carrier; and determining whether to drop one of the uplink transmission or transmission of a sounding reference signal (SRS) on a second carrier different than the first carrier based on a timing between a reception time of the PDCCH and a scheduled time for transmitting the SRS.

Example 2 is the method of Example 1, wherein the timing is based on a subcarrier spacing for the first carrier or the second carrier.

Example 3 is the method of Example 2, wherein the subcarrier spacing comprises a smaller subcarrier spacing between the first carrier and the second carrier.

Example 4 is the method of any of Examples 1-3, further comprising: receiving a second PDCCH from the base station, the second PDCCH scheduling the SRS on the second carrier; and wherein the determining whether to drop the one of the uplink transmission or the transmission of the SRS is based on a timing between a reception time of the second PDCCH and a scheduled time for the uplink transmission.

Example 5 is the method of Example 4, further comprising: determining that the uplink transmission includes one of: a periodic channel state information (P-CSI) including one of only a channel quality indicator (CQI) or only a precoding matrix indicator (PMI) on one of a physical uplink control channel (PUCCH) or a physical uplink shared channel (PUSCH); or a non-carrier switched SRS; wherein the uplink transmission is dropped in response to the uplink transmission overlapping with one of the scheduled time for transmitting the SRS or a carrier switching time associated with the SRS, wherein the SRS is aperiodic SRS (A-SRS).

Example 6 is the method of Example 4, further comprising: determining that the uplink transmission includes one of: a periodic channel state information (P-CSI) including one of only a channel quality indicator (CQI) or only a precoding matrix indicator (PMI) on one of a physical uplink control channel (PUCCH) or a physical uplink shared channel (PUSCH); or a non-carrier switched SRS; wherein the determining whether to drop the one of the uplink transmission or the transmission of the SRS is further based on a timing between an action time associated with the SRS and the scheduled time for the uplink transmission, wherein the SRS is semi-persistent SRS (SP-SRS); wherein the uplink transmission is dropped in response to the uplink transmission overlapping with one of the scheduled time for transmitting the SRS or a carrier switching time associated with the SRS.

Example 7 is the method of Example 6, wherein the action time is based at least on a time for transmission of a hybrid automatic repeat request (HARQ)-acknowledgment (ACK) (HARQ-ACK) associated with a channel carrying an activation command for the SP-SRS.

Example 8 is the method of Example 4, further comprising: determining that the uplink transmission includes aperiodic channel state information (A-CSI) including one of only a channel quality indicator (CQI) or only a precoding matrix indicator (PMI) on a physical uplink shared channel (PUSCH); wherein the uplink transmission is dropped in response to the uplink transmission overlapping with one of the scheduled time for transmitting the SRS or a carrier switching time associated with the SRS, wherein the SRS is aperiodic SRS (A-SRS).

Example 9 is the method of Example 4, further comprising: determining that the uplink transmission includes a physical uplink shared channel (PUSCH) that does not carry uplink control information (UCI); wherein the uplink transmission is dropped in response to the uplink transmission overlapping with one of the scheduled time for transmitting the SRS or a carrier switching time associated with the SRS.

Example 10 is the method of any of Examples 1-9, wherein the timing includes a switching time for switching from the first carrier to the second carrier to transmit the SRS.

Example 11 is the method of any of Examples 1-3 or 10, further comprising: determining that the uplink transmission is a hybrid automatic repeat request (HARQ)-acknowledgment (ACK) (HARQ-ACK) on a physical uplink control channel (PUCCH), wherein the HARQ-ACK either: corresponds to a dynamic grant, comprises a semi-persistently scheduled (SPS) HARQ-ACK (SPS HARQ-ACK), wherein the PDCCH activates the SPS HARQ-ACK, or is in response to the PDCCH, wherein the PDCCH releases the SPS HARQ-ACK; and wherein the SRS is dropped in response to the HARQ-ACK overlapping with one of the scheduled time for transmitting the SRS or a carrier switching time associated with the SRS.

Example 12 is the method of any of Examples 1-3 or 10, further comprising: receiving a second PDCCH from the base station, the second PDCCH scheduling a physical uplink shared channel (PUSCH); and determining that the uplink transmission is a hybrid automatic repeat request (HARQ)-acknowledgment (ACK) (HARQ-ACK) on a physical uplink control channel (PUCCH), wherein the HARQ-ACK is multiplexed with the PUSCH; wherein the determining whether to drop the one of the uplink transmission or the transmission of the SRS is further based on a reception time of the second PDCCH; wherein the SRS is dropped in response to the PUSCH overlapping with one of the scheduled time for transmitting the SRS or a carrier switching time associated with the SRS.

Example 13 is the method of any of Examples 1-3 or 10, further comprising: determining that the uplink transmission is one of a scheduling request (SR) or a physical uplink shared channel (PUSCH) multiplexed with a periodic channel state information (P-CSI) on a physical uplink control channel (PUCCH) including one of a rank indicator (RI) or a channel state information reference signal resource indicator (CRI); and wherein the SRS is dropped in response to the uplink transmission overlapping with one of the scheduled time for transmitting the SRS or a carrier switching time associated with the SRS.

Example 14 is the method of any of Examples 1-3 or 10, further comprising: determining that the uplink transmission includes a semi-persistently scheduled channel state information (SP-CSI) including one of a rank indicator (RI) or a channel state information reference signal resource indicator (CRI); wherein the determining whether to drop the one of the uplink transmission or the transmission of the SRS is further based on the timing between an action time associated with the SP-CSI and the scheduled time for transmitting the SRS; wherein the SRS is dropped in response to the SP-CSI overlapping with one of the scheduled time for transmitting the SRS or a carrier switching time associated with the SRS.

Example 15 is the method of Example 14, wherein the action time is based at least on a time for transmission of a hybrid automatic repeat request (HARQ)-acknowledgment (ACK) (HARQ-ACK) associated with a channel carrying an activation command for the SP-CSI.

Example 16 is the method of any of Examples 1-3 or 10, further comprising: determining that the uplink transmission is on a physical uplink shared channel (PUSCH) including one of a rank indicator (RI) or a channel state information reference signal resource indicator (CRI) associated with aperiodic channel state information (A-CSI); wherein the SRS is dropped in response to the PUSCH overlapping with one of the scheduled time for transmitting the SRS or a carrier switching time associated with the SRS.

Example 17 is the method of any of Examples 1-3 or 10, further comprising: determining that the uplink transmission is on a physical random access channel (PRACH); wherein the SRS is dropped in response to the PRACH overlapping with one of the scheduled time for transmitting the SRS or a carrier switching time associated with the SRS.

Example 18 is the method of any of Examples 1-3 or 10, further comprising: determining that the uplink transmission includes aperiodic channel state information (A-CSI) on a physical uplink shared channel (PUSCH); wherein the SRS is dropped in response to the PUSCH overlapping with one of the scheduled time for transmitting the SRS or a carrier switching time associated with the SRS and the SRS is one of periodic SRS (P-SRS) or semi-persistently scheduled SRS (SPS SRS).

Example 19 is an apparatus for wireless communication, comprising: means for receiving a physical downlink control channel (PDCCH) from a base station, the PDCCH scheduling an uplink transmission on a first carrier; and means for determining whether to drop one of the uplink transmission or transmission of a sounding reference signal (SRS) on a second carrier different than the first carrier based on a timing between a reception time of the PDCCH and a scheduled time for transmitting the SRS.

Example 20 is the apparatus of Example 19, wherein the timing is based on a subcarrier spacing for the first carrier or the second carrier.

Example 21 is the apparatus of Example 20, wherein the subcarrier spacing comprises a smaller subcarrier spacing between the first carrier and the second carrier.

Example 22 is the apparatus of any of Examples 19-21, wherein the means for receiving is configured to receive a second PDCCH from the base station, the second PDCCH scheduling the SRS on the second carrier; and wherein the means for determining is configured to determine whether to drop the one of the uplink transmission or the transmission of the SRS based on a timing between a reception time of the second PDCCH and a scheduled time for the uplink transmission.

Example 23 is the apparatus of any of Examples 19-22, wherein the timing includes a switching time for switching from the first carrier to the second carrier to transmit the SRS.

Example 24 is an apparatus for wireless communication, comprising: a processor; memory coupled with the processor; and instructions stored in the memory and operable, when executed by the processor, to cause the apparatus to: receive a physical downlink control channel (PDCCH) from a base station, the PDCCH scheduling an uplink transmission on a first carrier; and determine whether to drop one of the uplink transmission or transmission of a sounding reference signal (SRS) on a second carrier different than the first carrier based on a timing between a reception time of the PDCCH and a scheduled time for transmitting the SRS.

Example 25 is the apparatus of Example 24, wherein the timing is based on a subcarrier spacing for the first carrier or the second carrier.

Example 26 is the apparatus of Example 25, wherein the subcarrier spacing comprises a smaller subcarrier spacing between the first carrier and the second carrier.

Example 27 is the apparatus of any of Examples 24-26, wherein the instructions, when executed by the processor, further cause the apparatus to receive a second PDCCH

What is claimed is:

1. A method of wireless communication at a user equipment (UE), comprising:
    receiving a physical downlink control channel (PDCCH) from a base station, the PDCCH scheduling an uplink transmission on a first carrier;
    determining whether to drop one of the uplink transmission or transmission of a sounding reference signal (SRS) on a second carrier different than the first carrier based on a timing between a reception time of the PDCCH and a scheduled time for transmitting the SRS;
    determining that the uplink transmission is a hybrid automatic repeat request (HARQ)-acknowledgment (ACK) (HARQ-ACK) on a physical uplink control channel (PUCCH), wherein the HARQ-ACK either:
        corresponds to a dynamic grant,
        comprises a semi-persistently scheduled (SPS) HARQ-ACK (SPS HARQ-ACK), wherein the PDCCH activates the SPS HARQ-ACK, or
        is in response to the PDCCH, wherein the PDCCH releases the SPS HARQ-ACK; and
    wherein the SRS is dropped in response to the HARQ-ACK overlapping with one of the scheduled time for transmitting the SRS or a carrier switching time associated with the SRS.

2. The method of claim 1, wherein the timing is based on a subcarrier spacing for the first carrier or the second carrier.

3. The method of claim 2, wherein the subcarrier spacing comprises a smaller subcarrier spacing between the first carrier and the second carrier.

4. The method of claim 1, further comprising:
    receiving a second PDCCH from the base station, the second PDCCH scheduling the SRS on the second carrier, the SRS being a carrier-switched SRS; and
    wherein the determining whether to drop the one of the uplink transmission or the transmission of the carrier-switched SRS is based on a timing between a reception time of the second PDCCH and a scheduled time for the uplink transmission.

5. The method of claim 1, wherein the timing includes a switching time for switching from the first carrier to the second carrier to transmit the SRS.

6. The method of claim 1, further comprising:
    receiving a second PDCCH from the base station, the second PDCCH scheduling a physical uplink shared channel (PUSCH); and
    wherein the HARQ-ACK is multiplexed with the PUSCH;
    wherein the determining whether to drop the one of the uplink transmission or the transmission of the SRS is further based on a reception time of the second PDCCH;
    wherein the SRS is dropped in response to the PUSCH overlapping with one of the scheduled time for transmitting the SRS or a carrier switching time associated with the SRS.

7. An apparatus for wireless communication, comprising:
    means for receiving a physical downlink control channel (PDCCH) from a base station, the PDCCH scheduling an uplink transmission on a first carrier;
    means for determining whether to drop one of the uplink transmission or transmission of a sounding reference signal (SRS) on a second carrier different than the first carrier based on a timing between a reception time of the PDCCH and a scheduled time for transmitting the SRS;
    the means for determining further configured to determine that the uplink transmission is a hybrid automatic repeat request (HARQ)-acknowledgment (ACK) (HARQ-ACK) on a physical uplink control channel (PUCCH), wherein the HARQ-ACK either:
        corresponds to a dynamic grant,
        comprises a semi-persistently scheduled (SPS) HARQ-ACK (SPS HARQ-ACK), wherein the PDCCH activates the SPS HARQ-ACK, or
        is in response to the PDCCH, wherein the PDCCH releases the SPS HARQ-ACK; and
    wherein the SRS is dropped in response to the HARQ-ACK overlapping with one of the scheduled time for transmitting the SRS or a carrier switching time associated with the SRS.

8. The apparatus of claim 7, wherein the timing is based on a subcarrier spacing for the first carrier or the second carrier.

9. The apparatus of claim 8, wherein the subcarrier spacing comprises a smaller subcarrier spacing between the first carrier and the second carrier.

10. The apparatus of claim 7,
    wherein the means for receiving is configured to receive a second PDCCH from the base station, the second PDCCH scheduling the SRS on the second carrier; and
    wherein the means for determining is configured to determine whether to drop the one of the uplink transmission or the transmission of the SRS based on a timing between a reception time of the second PDCCH and a scheduled time for the uplink transmission.

11. The apparatus of claim 7, wherein the timing includes a switching time for switching from the first carrier to the second carrier to transmit the SRS.

12. An apparatus for wireless communication, comprising:
    one or more processors;
    at least one memory coupled with the one or more processors; and
    instructions stored in the at least one memory and operable, when executed by at least one of the one or more processors, to cause the apparatus to:
        receive a physical downlink control channel (PDCCH) from a base station, the PDCCH scheduling an uplink transmission on a first carrier;
        determine whether to drop one of the uplink transmission or transmission of a sounding reference signal (SRS) on a second carrier different than the first carrier based on a timing between a reception time of the PDCCH and a scheduled time for transmitting the SRS;
        determine that the uplink transmission is a hybrid automatic repeat request (HARQ)-acknowledgment (ACK) (HARQ-ACK) on a physical uplink control channel (PUCCH), wherein the HARQ-ACK either:
            corresponds to a dynamic grant, comprises a semi-persistently scheduled (SPS) HARQ-ACK (SPS HARQ-ACK), wherein the PDCCH activates the SPS HARQ-ACK, or is in response to the PDCCH, wherein the PDCCH releases the SPS HARQ-ACK; and wherein the SRS is dropped in response to the HARQ-ACK overlapping with one of the scheduled time for transmitting the SRS or a carrier switching time associated with the SRS.

13. The apparatus of claim 12, wherein the timing is based on a subcarrier spacing for the first carrier or the second carrier.

14. The apparatus of claim 13, wherein the subcarrier spacing comprises a smaller subcarrier spacing between the first carrier and the second carrier.

15. The apparatus of claim 12, wherein the instructions, when executed by the at least one of the one or more processors, further cause the apparatus to receive a second PDCCH from the base station, the second PDCCH scheduling the SRS on the second carrier; and wherein the instructions, when executed by the at least one of the one or more processors, further cause the apparatus to determine whether to drop the one of the uplink transmission or the transmission of the SRS based on a timing between a reception time of the second PDCCH and a scheduled time for the uplink transmission.

16. The apparatus of claim 12, wherein the timing includes a switching time for switching from the first carrier to the second carrier to transmit the SRS.

17. A non-transitory computer-readable medium storing computer executable code, the code when executed by one or more processors cause the one or more processors to:

receive a physical downlink control channel (PDCCH) from a base station, the PDCCH scheduling an uplink transmission on a first carrier;

determine whether to drop one of the uplink transmission or transmission of a sounding reference signal (SRS) on a second carrier different than the first carrier based on a timing between a reception time of the PDCCH and a scheduled time for transmitting the SRS;

determine that the uplink transmission is a hybrid automatic repeat request (HARQ)-acknowledgment (ACK) (HARQ-ACK) on a physical uplink control channel (PUCCH), wherein the HARQ-ACK either:

corresponds to a dynamic grant, comprises a semi-persistently scheduled (SPS) HARQ-ACK (SPS HARQ-ACK) wherein the PDCCH activates the SPS HARQ-ACK, or is in response to the PDCCH, wherein the PDCCH releases the SPS HARQ-ACK; and wherein the SRS is dropped in response to the HARQ-ACK overlapping with one of the scheduled time for transmitting the SRS or a carrier switching time associated with the SRS.

* * * * *